United States Patent
Noguchi et al.

(10) Patent No.: US 10,212,294 B2
(45) Date of Patent: Feb. 19, 2019

(54) INPUT DEVICE AND NON-TRANSITORY COMPUTER READABLE MEDIUM

(71) Applicant: FUJI XEROX CO., LTD., Tokyo (JP)

(72) Inventors: Nozomi Noguchi, Kanagawa (JP); Asako Takayama, Kanagawa (JP); Shunsuke Kodaira, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 15/689,516

(22) Filed: Aug. 29, 2017

(65) Prior Publication Data

US 2018/0278765 A1 Sep. 27, 2018

(30) Foreign Application Priority Data

Mar. 22, 2017 (JP) ................. 2017-056699

(51) Int. Cl.
*G06F 3/12* (2006.01)
*H04N 1/00* (2006.01)
*G06F 3/0485* (2013.01)

(52) U.S. Cl.
CPC ..... *H04N 1/00411* (2013.01); *H04N 1/00493* (2013.01); *G06F 3/04855* (2013.01); *H04N 2201/0094* (2013.01)

(58) Field of Classification Search
CPC ........... H04N 1/00411; H04N 1/00493; H04N 2201/0094; H04N 1/00424; G06F 3/04855; G06F 2203/04104; G06F 2203/04108
See application file for complete search history.

(56) References Cited

U.S. PATENT DOCUMENTS

| | | | |
|---|---|---|---|
| 2004/0153297 A1* | 8/2004 | Furumoto | G06F 17/5086 703/7 |
| 2007/0052693 A1 | 3/2007 | Watari | |
| 2012/0216136 A1* | 8/2012 | Karstens | G06F 3/0481 715/765 |
| 2013/0314446 A1* | 11/2013 | Maekawa | G06F 3/041 345/684 |
| 2014/0146085 A1* | 5/2014 | Takeda | G06F 1/1632 345/648 |
| 2014/0184572 A1* | 7/2014 | Ito | G06F 3/0418 345/178 |

FOREIGN PATENT DOCUMENTS

JP 2007-65767 A 3/2007

* cited by examiner

Primary Examiner — Moustapha Diaby
(74) Attorney, Agent, or Firm — Oliff PLC

(57) ABSTRACT

An input device includes a display, a protrusion, and a detector. The display includes a first region that displays contents and a second region that displays an operator that receives a command input with respect the displayed contents. The protrusion is disposed alongside the display. In the detector, a display region of the display is set as a detection range, and the detector detects the command input by an input object. A positional layout of the second region displayed on the display changes in accordance with a positional relationship with the protrusion.

16 Claims, 23 Drawing Sheets

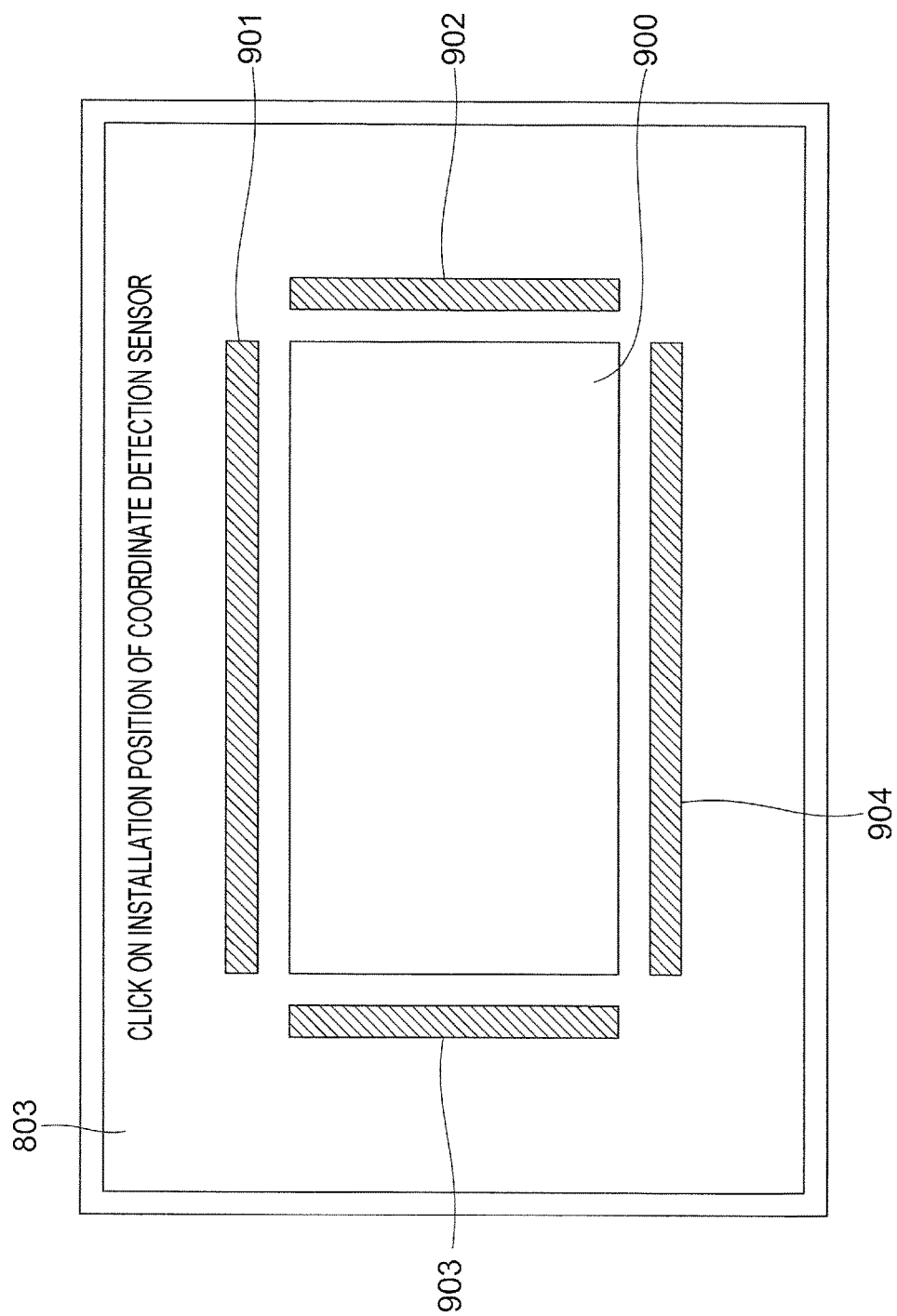

INPUT DEVICE AND NON-TRANSITORY COMPUTER READABLE MEDIUM

CROSS-REFERENCE TO RELATED APPLICATIONS

This application is based on and claims priority under 35 USC 119 from Japanese Patent Application No. 2017-056699 filed Mar. 22, 2017.

BACKGROUND

Technical Field

The present invention relates to input devices and non-transitory computer readable media.

SUMMARY

According to an aspect of the invention, there is provided an input device including a display, a protrusion, and a detector. The display includes a first region that displays contents and a second region that displays an operator that receives a command input with respect the displayed contents. The protrusion is disposed alongside the display. In the detector, a display region of the display is set as a detection range, and the detector detects the command input by an input object. A positional layout of the second region displayed on the display changes in accordance with a positional relationship with the protrusion.

BRIEF DESCRIPTION OF THE DRAWINGS

Exemplary embodiments of the present invention will be described in detail based on the following figures, wherein:

FIG. 23 illustrates an example of an interface screen displayed on a display unit for receiving the installation position of the coordinate detection sensor.

DETAILED DESCRIPTION

Exemplary embodiments of the present invention will be described in detail below with reference to the drawings.
First Exemplary Embodiment An image forming apparatus will be described here as an example. The image forming apparatus according to this exemplary embodiment forms an image onto a recording medium (which may sometimes be representatively referred to as "sheet" hereinafter) and has a copying function, a scanning function, a facsimile transmitting-receiving function, and a printing function. The image forming apparatus does not necessarily have to be equipped with all of these functions and may be an apparatus specialized in any one of the functions, such as a photocopier, a scanner, a facsimile transmitter-receiver, or a printer (including a three-dimensional printer).

Overall Configuration of Image Forming Apparatus

Figure 1:
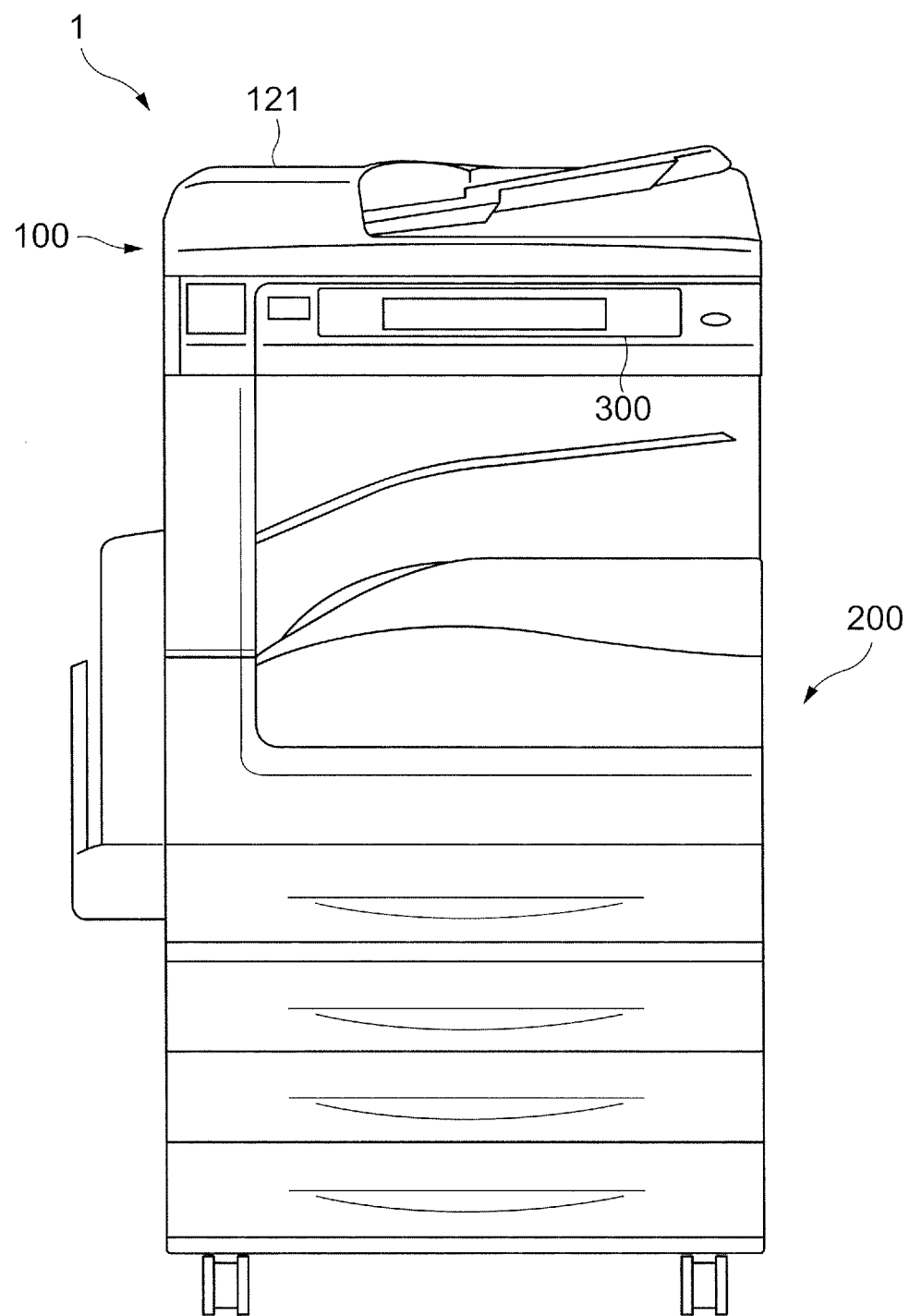
FIG. 1 is an external view of an image forming apparatus according to a first exemplary embodiment.
Figure 2:
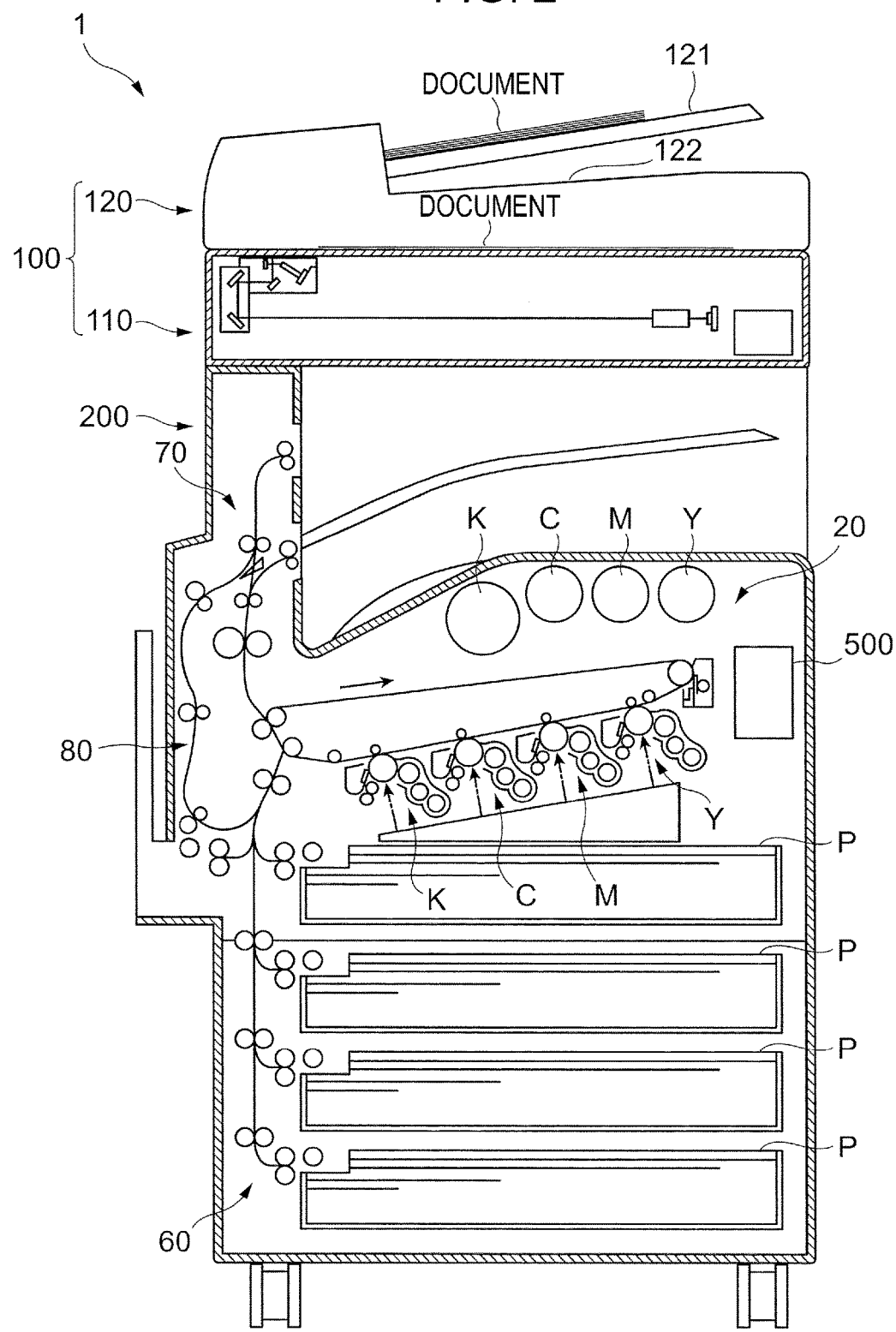
FIG. 2 illustrates the internal structure of the image forming apparatus according to the first exemplary embodiment.

FIG. 1 is an external view of an image forming apparatus 1 according to a first exemplary embodiment. FIG. 2 illustrates the internal structure of the image forming apparatus 1 according to the first exemplary embodiment.

The image forming apparatus 1 includes an image reading device 100 that reads an image of a document and an image recording device 200 that records the image onto a recording medium. The image forming apparatus 1 also includes a user interface (UI) 300 that receives an operation input by a user and that displays various types of information to the user. Moreover, the image forming apparatus 1 includes a controller 500 that controls the overall operation of the image forming apparatus 1. The controller 500 is an example of a detector.

The image reading device 100 is disposed at an upper portion of the image forming apparatus 1. The image recording device 200 is disposed below the image reading device 100 and contains the controller 500 therein. The user interface 300 is disposed at the front side of the upper portion of the image forming apparatus 1, that is, at the front side of an image reading unit 110, which will be described later, of the image reading device 100.

First, the image reading device 100 will be described.

The image reading device 100 includes the image reading unit 110 that reads an image of a document and a document transport unit 120 that transports the document to the image reading unit 110. The document transport unit 120 is disposed at an upper portion of the image reading device 100, and the image reading unit 110 is disposed at a lower portion of the image reading device 100.

The document transport unit 120 has a document accommodating section 121 that accommodates a document or documents and a document output section 122 to which a document transported from the document accommodating section 121 is output, and transports the document from the document accommodating section 121 to the document output section 122. The document transport unit 120 is also called an auto document feeder (ADF).

Next, the image recording device 200 will be described.

The image recording device 200 includes an image forming unit 20 that forms an image onto a sheet P, a sheet feeding unit 60 that feeds the sheet P to the image forming unit 20, a sheet output unit 70 that outputs the sheet P having an image formed thereon at the image forming unit 20, and an inversion transport unit 80 that inverts the front and rear faces of the sheet P having the image formed on one face thereof at the image forming unit 20 and transports the sheet P again toward the image forming unit 20.

The user interface 300 is an example of an input unit (i.e., input device) used for inputting a user command to the apparatus (i.e., the image forming apparatus 1) and includes a display unit and an operation receiving unit, which will be described in detail later. The display unit displays a screen for providing various types of information and also displays software buttons associated with individual functions. The operation receiving unit has, for example, a function of detecting an operation performed on a hardware button and a function of detecting an operation performed on a software button.

In a case where an optical detector is to be used as an operation detecting unit, a spatial region outside the display unit may be used as a detection region so long as the region is within an optically detectable range. For example, an operation performed on a symbol printed on the surface of the housing may also be detected similarly to a software button displayed on the display unit.

Basic Operation of Image Forming Apparatus

The image forming apparatus 1 operates in the following manner.

For example, the image forming apparatus 1 is capable of copying a document. Specifically, the image forming apparatus 1 supplies image data of a document read by the image reading device 100 to the image recording device 200 so as to form the image of the document onto a sheet P.

Furthermore, the image forming apparatus 1 may receive a print job from, for example, a personal computer (PC) (not shown) connected to a communication line and form a received image onto a sheet P. Specifically, the image forming apparatus 1 transmits image data contained in the print job received via the communication line to the image recording device 200 so as to form the image onto the sheet P.

Moreover, the image forming apparatus 1 is capable of performing facsimile transmission and reception. Specifically, the image forming apparatus 1 may transmit image data of a document read by the image reading device 100 via the communication line.

Furthermore, the image forming apparatus 1 is capable of storing image data of a document. Specifically, the image forming apparatus 1 may store the image data of the document in the apparatus or in the PC connected via the communication line.

Configuration of Controller and Other Devices

Figure 3:
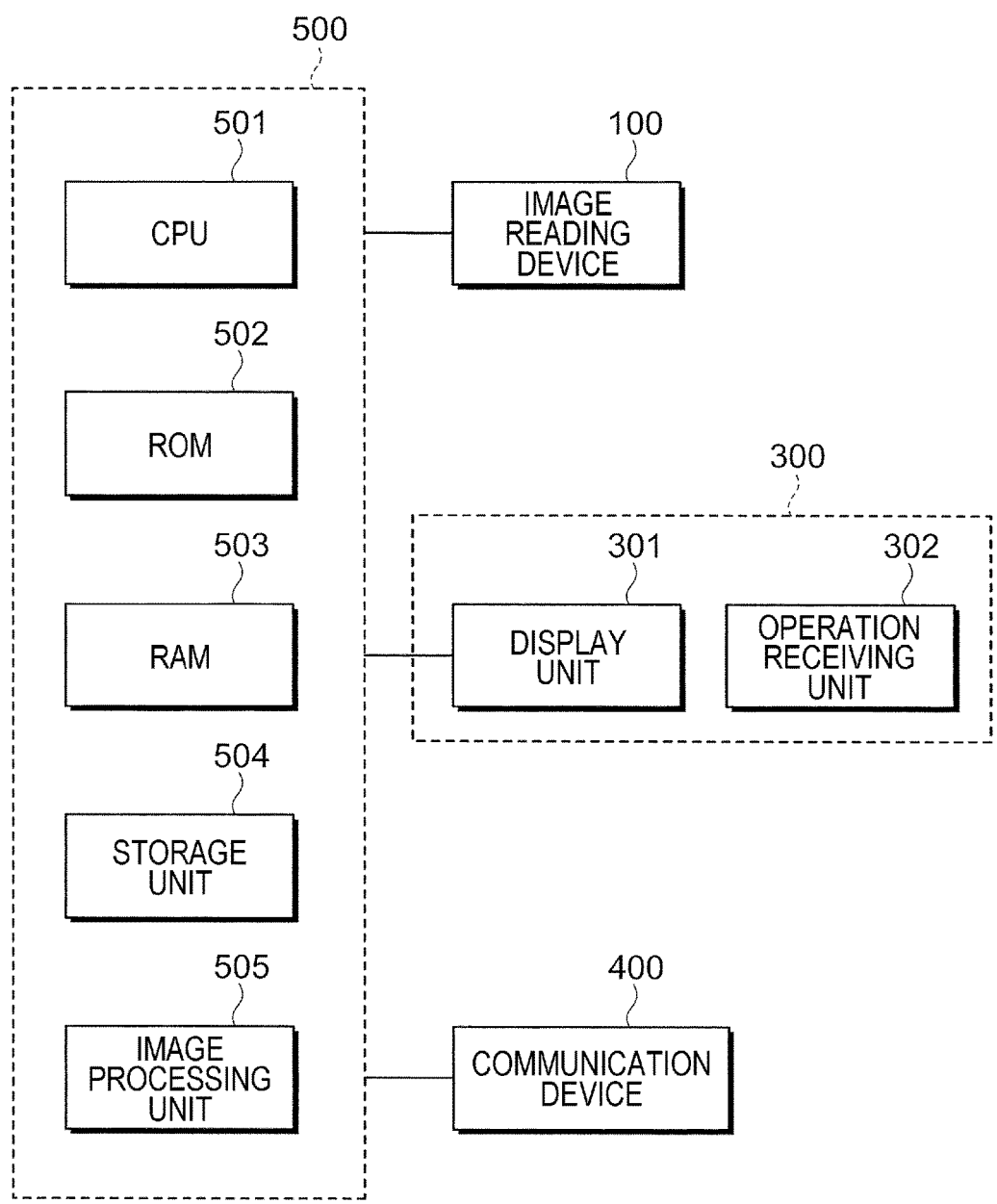
FIG. 3 illustrates an example of a functional block configuration of a controller and other devices constituting the image forming apparatus.

FIG. 3 illustrates an example of a functional block configuration of the controller 500 and other devices constituting the image forming apparatus 1.

The controller 500 includes a control unit that controls the entire apparatus (i.e., a central processing unit (CPU) 501, a read-only memory (ROM) 502, and a random access memory (RAM) 503), a storage unit 504 used for storing, for example, image data, and an image processing unit 505 that performs image processing, such as color correction and gradation correction, on an image expressed by image data. The controller 500 is an example of an information processing device.

The CPU 501 uses the RAN 503 as a work area and executes a program read from the ROM 502.

The storage unit 504 is formed of, for example, a hard disk device or a semiconductor memory and stores data related to a document image read by the image reading device 100 or an image received via a communication device 400. The storage unit 504 is also used for storing a program, where appropriate.

The image processing unit 505 is configured as, for example, a dedicated processor or a processing board and executes image processing, such as color correction and gradation correction.

The user interface 300 includes a display unit 301 used for displaying, for example, an operation screen and an operation receiving unit 302 that receives an operation input by a user. The operation receiving unit 302 is an example of a detector.

The display unit 301 is formed of, for example, a liquid-crystal display panel or an organic electroluminescence (EL) display panel.

The operation receiving unit 302 functions as a detector that detects the position or movement of an input object as a command input by the user. Examples that realize this function include a contact-type coordinate input device and a noncontact-type coordinate input device. Specifically, a contact-type coordinate input device detects a change in physical quantity occurring due to a physical contact with a hardware button, such as a button or a switch, or a physical contact between an input object, such as a finger or a pen, and an operation screen (i.e., detection region), and detects the coordinate position in contact with the input object based on the detected information. A noncontact-type coordinate input device detects, in a noncontact manner, the coordinate position of an input object moving across a detection plane constituted of, for example, infrared light.

A command input refers to an input operation intended to make a certain command. Examples of a command input include pressing of a hardware button, screen scrolling, and selection of an icon. An input object is an object used when making a certain command to the input device and may be, for example, a finger or a pen.

Examples of the detection method of the contact-type coordinate input device include a matrix switch method in which an electrode group arranged in the row direction and an electrode group arranged in the column direction are disposed in two upper and lower layers and in which a contact position is detected as a current-application position, a resistive film method in which two transparent electrode films (i.e., thin films functioning as resistive films) are disposed in two upper and lower layers and in which a contact position is detected based on a voltage value, a surface acoustic wave method in which vibrational waves are generated from piezoelectric elements disposed at multiple corners of a substrate, such as glass, and in which a contact position is detected based on the reflection time of the vibrational waves, an electromagnetic induction method in which a dedicated pen called an electronic pen is used, and an electrostatic capacitance method in which a contact position is detected based on a change in electrostatic capacitance occurring between a fingertip and an electroconductive film.

The contact-type coordinate input device is disposed over the surface of the display unit 301.

On the other hand, the noncontact-type coordinate input device has a light-emitting element (light source) that emits infrared light forming an optical detection plane (detection region), and also has a sensor unit that detects the position of an input object moving across the detection plane. The sensor unit may be of a type that uses imaging cameras or a type that uses light-receiving elements. For example, in the case of the type that uses imaging cameras, the imaging cameras are disposed at opposite ends of one of the sides that constitute the detection plane. In the case where light-receiving elements, such as photodiodes (PDs), are used, there are a method in which the light-receiving elements are disposed at positions facing light-emitting elements, such as light-emitting diodes (LEDs), and a method in which the light-receiving elements and the light-emitting elements are alternately arranged in a single line.

In either case, the noncontact-type coordinate input device is disposed along at least one side of the display unit 301. In this case, the length of one side of the noncontact-type coordinate input device is set in accordance with the target region to be detected. Normally, the length of one side of the noncontact-type coordinate input device is larger than the length of one side of the display unit 301.

The communication device 400 is formed of, for example, a modem or a local area-network (LAN) interface and is used for facsimile communication or for communication with an external device.

Operation-Input-Detection Functional Unit

Next, an operation-input-detection functional unit realized in accordance with cooperation between the user interface 300 and the controller 500 (i.e., the CPU 501) will be described. The operation-input-detection functional unit is an example of a function provided by the input device and is realized in accordance with cooperation between the user interface 300 and the controller 500 (i.e., the CPU 501). Alternatively, the operation-input-detection functional unit may be realized as a function of the user interface 300 alone.

In this exemplary embodiment, the controller 500 functioning as an input device receives information related to the position and movement of an input object in the detection region (e.g., an output column of detection coordinates) from the operation receiving unit 302 and detects the contents of an operation input by the user based on the positional relationship with individual detection ranges allocated to operators (e.g., software buttons, icons, operation bars, and menu bars) to be operated by the user.

The operators are targets of operations to be input by the user and are provided such that the presence thereof may be visually ascertained by the user. Moreover, by operating any one of the operators, the user is capable of inputting a certain kind of operation. The operators may be physically provided in the input device (e.g., in the form of buttons) or may be symbols or pictures (e.g., in the form of icons) displayed on the display screen.

In this exemplary embodiment, the detection region is a range in which the coordinates (i.e., input coordinates) of an input object are detectable by the coordinate input device. Needless to say, the detection region includes detection ranges corresponding to the individual operators.

Figure 4:
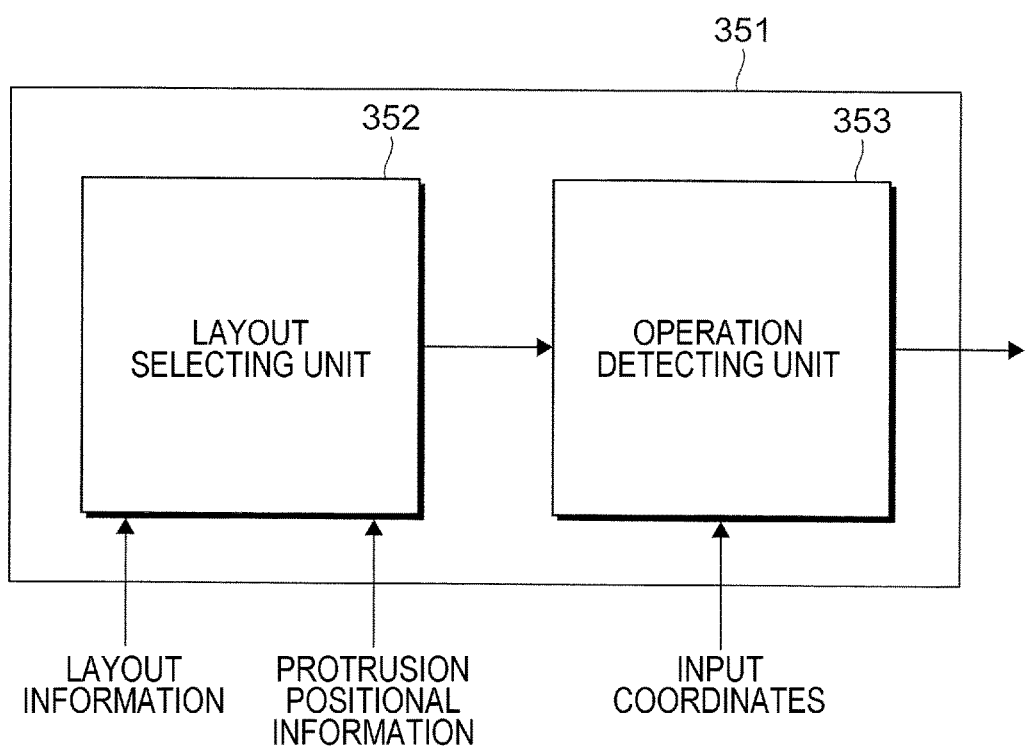
FIG. 4 illustrates an operation-input-detection functional unit used in the first exemplary embodiment.

FIG. 4 illustrates an operation-input-detection functional unit 351 used in the first exemplary embodiment.

In FIG. 4, it is assumed that a contact-type coordinate input device is used as the operation receiving unit 302. In this case, since the operation receiving unit 302 is disposed on the front surface of the display unit 301, the display region of the display unit 301 matches the input-object detection region of the operation receiving unit 302.

Furthermore, it is assumed that a frame (see FIG. 6) is disposed so as to extend along three sides of the display unit 301. In this exemplary embodiment, a structural body having a surface that is one level higher than an operation surface will be referred to as "protrusion". The frame is an example of a protrusion in that it protrudes from the display unit 301 as an operation surface.

The protrusion not only provides physical outer edges to the detection region, but also provides psychological outer edges to the user. For example, when there is an area that is one level higher like the protrusion, the user may subconsciously try to avoid touching the protrusion.

A strip-shaped operation region, such as a scroll bar or an index bar, is normally disposed along an outer edge of the display unit 301. Therefore, if an outer edge along which the protrusion is disposed and an outer edge where, for example, a scroll bar is disposed are the same, the operation position tends to shift downward (i.e., toward the center of the screen) from the display position of the scroll bar, thus making it difficult to properly operate an operator.

The operation-input-detection functional unit 351 according to this exemplary embodiment has a layout selecting unit 352 that selects the positional layout of operators based on layout information of a display image and positional information of a protrusion (protrusion positional information), and also has an operation detecting unit 353 that compares the coordinates (input coordinates) detected by the operation receiving unit 302 with the detection range of each operator so as to detect the contents of an operation input.

In this exemplary embodiment, the protrusion positional information includes positional information about three sides of the display unit 301, namely, the upper side, the left side, and the right side thereof.

Figure 5:
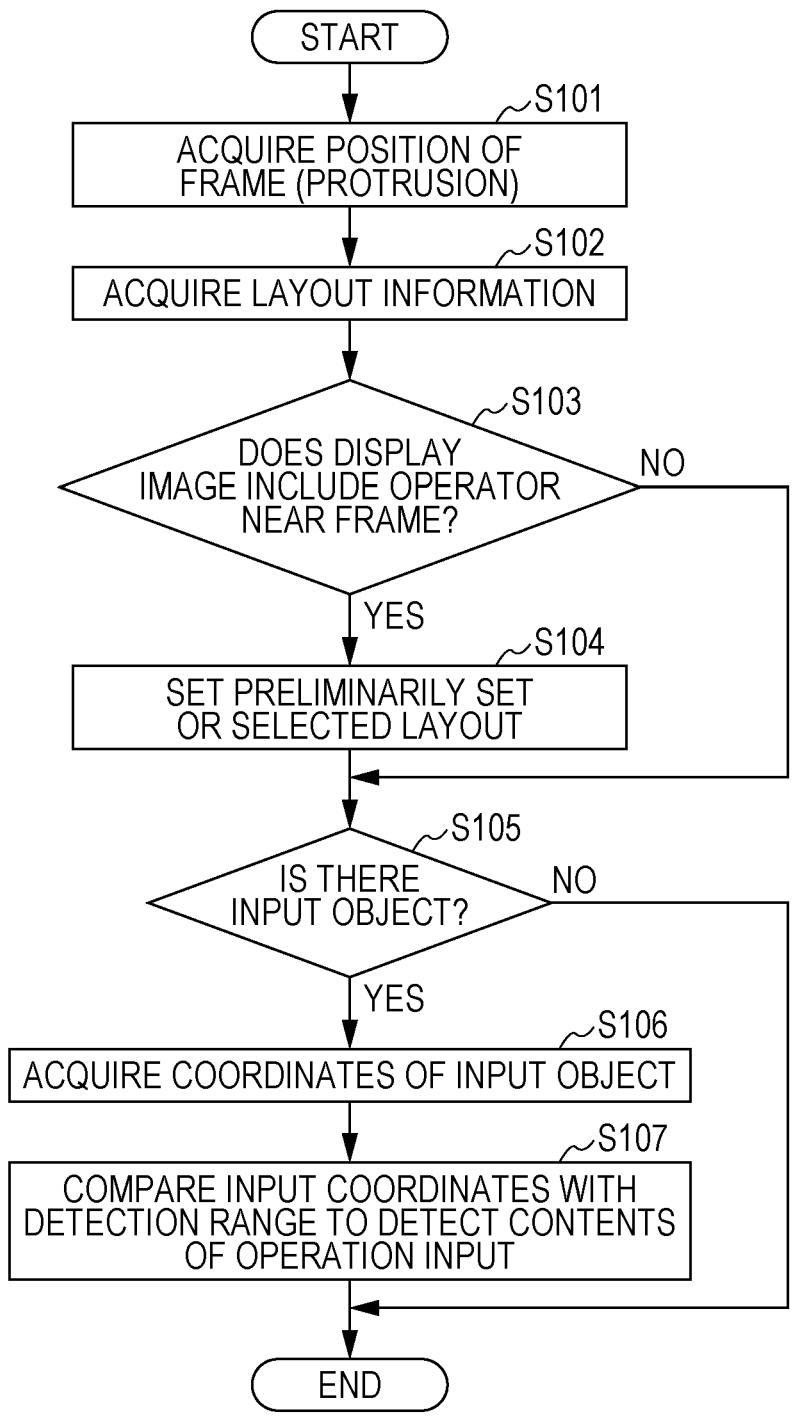
FIG. 5 is a flowchart illustrating an example of a detecting operation executed by the operation-input-detection functional unit.

FIG. 5 is a flowchart illustrating an example of a detecting operation executed by the operation-input-detection functional unit 351.

The operation by the operation-input-detection functional unit 351 is executed in two stages. The first-stage operation is executed every time the display screen is switched and is for selecting the layout of an operator, such as a scroll bar, for receiving a command input with respect to the contents displayed on the display unit 301. The contents refer to general contents displayed on the display unit and may be of any kind so long as the contents are displayed on the display unit, such as text, an image, a list, or an icon. For example, in a case where a list of items are displayed on the display unit, each one of the items may be an example of contents, or the entire list including the multiple items may be called contents.

The first-stage operation is executed by the layout selecting unit 352. The second-stage operation is executed every time a new operation input by an input object is detected. The second-stage operation is detected by the operation detecting unit 353.

First, in step S101, the layout selecting unit 352 acquires the position of the frame as a protrusion. In this exemplary embodiment, the upper side, the left side, and the right side of the display unit 301 are the frame positions.

Then, in step S102, the layout selecting unit 352 acquires layout information of a display image.

The display image includes a first display region used for displaying contents and a second display region in which operators for receiving a command input with respect to the contents is displayed. The first display region is an example of a first region, whereas the second display region is an example of a second region. The operators include a software button, an icon, an operation bar, and a menu bar.

An icon is used for commanding execution of a corresponding function. For example, an operation bar and a menu bar are strip-shaped operation regions each used for inputting a command with respect to the contents. An operation bar and a menu bar include, for example, a scroll bar and an index bar. An index bar includes an array of multiple indices. By clicking a certain index, the contents of the display screen are switchable to the contents corresponding to the clicked index. In other words, the display contents day be jumped to different display contents.

Subsequently, in step S103, the layout selecting unit 352 determines whether or not there is an operator disposed near the frame. The layout selecting unit 352 obtains a positive result if the distance between the display position of the operator and the frame is smaller than a predetermined reference distance, or obtains a negative result if the distance is larger than or equal to the reference distance. The reference distance used for the determination may be changeable by the user.

If a positive result is obtained in step S103, the layout selecting unit 352 proceeds to step S104 to set a preliminarily set or selected layout. In this exemplary embodiment, one or multiple layout candidates related to the layout of the operators are prepared, and the layout selecting unit 352 uses one of the prepared candidates for the display. The layout of the operators may be selectable in accordance with user's preference. A detailed example of the layout candidates will be described later.

If a negative result is obtained in step S103, the layout is not to be changed.

When the layout to be used for displaying the display image is completely set, the operation detecting unit 353 determines in step S105 whether or not there is an input object (e.g., a fingertip or a pen) based on whether or not there are input coordinates.

If there are no input coordinates to begin with or if the detected input coordinates have disappeared, the operation detecting unit 353 obtains a negative result and ends the detecting operation being executed. When the detecting operation ends, a new detecting operation commences.

If an input object is detected from the input coordinates, the operation detecting unit 353 acquires the coordinates of the input object in step S106. The operation detecting unit 353 acquires multiple coordinate sequences (movement trajectories) sampled for individual input objects that have been recognized.

In step S107, the operation detecting unit 353 compares the acquired input coordinates with the detection range set for each operator so as to detect the contents of the operation input. The detection ranges are associated with the positions of the respective operators on the display.

When the input coordinates are included in any of the detection ranges and a command, such as a click, is detected, the operation detecting unit 353 regards the operation performed on the corresponding operator as being effective.

Layout Candidate Examples

Examples of layout candidates set by the layout selecting unit 352 according to this exemplary embodiment will be described below with reference to FIGS. 6 to 10. The following description relates to a case where the operator is a scroll bar.

First Layout Example

Figure 6:
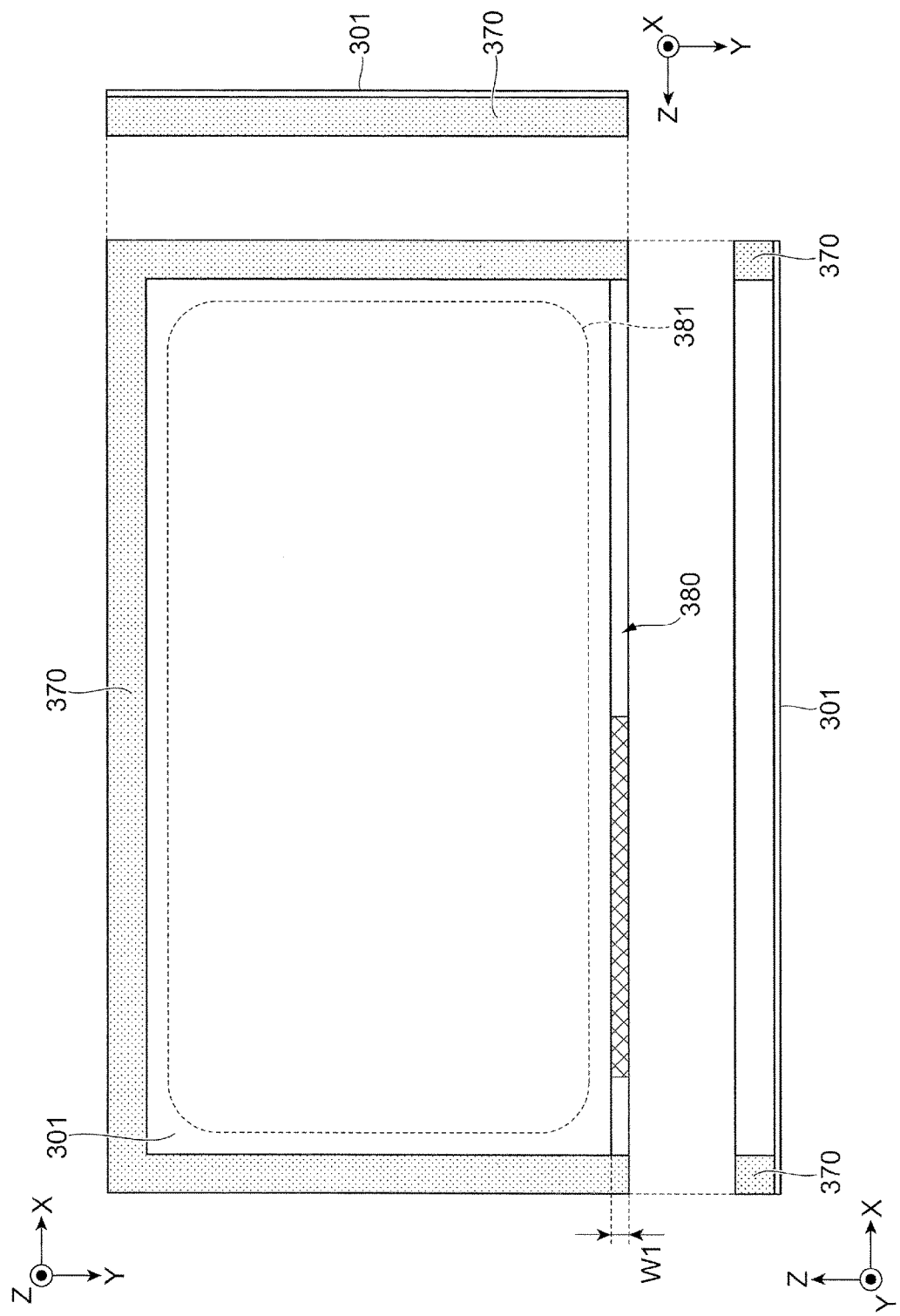
FIG. 6 illustrates a layout example of a scroll bar used for moving a display region in the horizontal direction.

FIG. 6 illustrates a layout example of a scroll bar 380 used for moving the display region in the horizontal direction.

In FIG. 6, the scroll bar 380 extends along the lower side of the display unit 301 at which the frame 370 is not disposed. In other words, the scroll bar 380 extends along an outer edge opposite from the frame 370 disposed at the upper side of the display unit 301.

FIG. 6 illustrates an example in which a region 381 that displays the contents and a region that displays the scroll bar 380 are arranged parallel to each other.

A display width W1 of the scroll bar 380 is a standard size. In this exemplary embodiment, a standard size refers to the original display width prepared in a display image and is narrower than an expanded size (expanded width W3) after expansion, which will be described later.

In the layout shown in FIG. 6, the frame 370 does not exist at the lower side of the display unit 301 where the scroll bar 380 is disposed, so that the user may operate the scroll bar 380 with no difficulty even if the scroll bar 380 is of a standard size.

Second Layout Example

Figure 7:
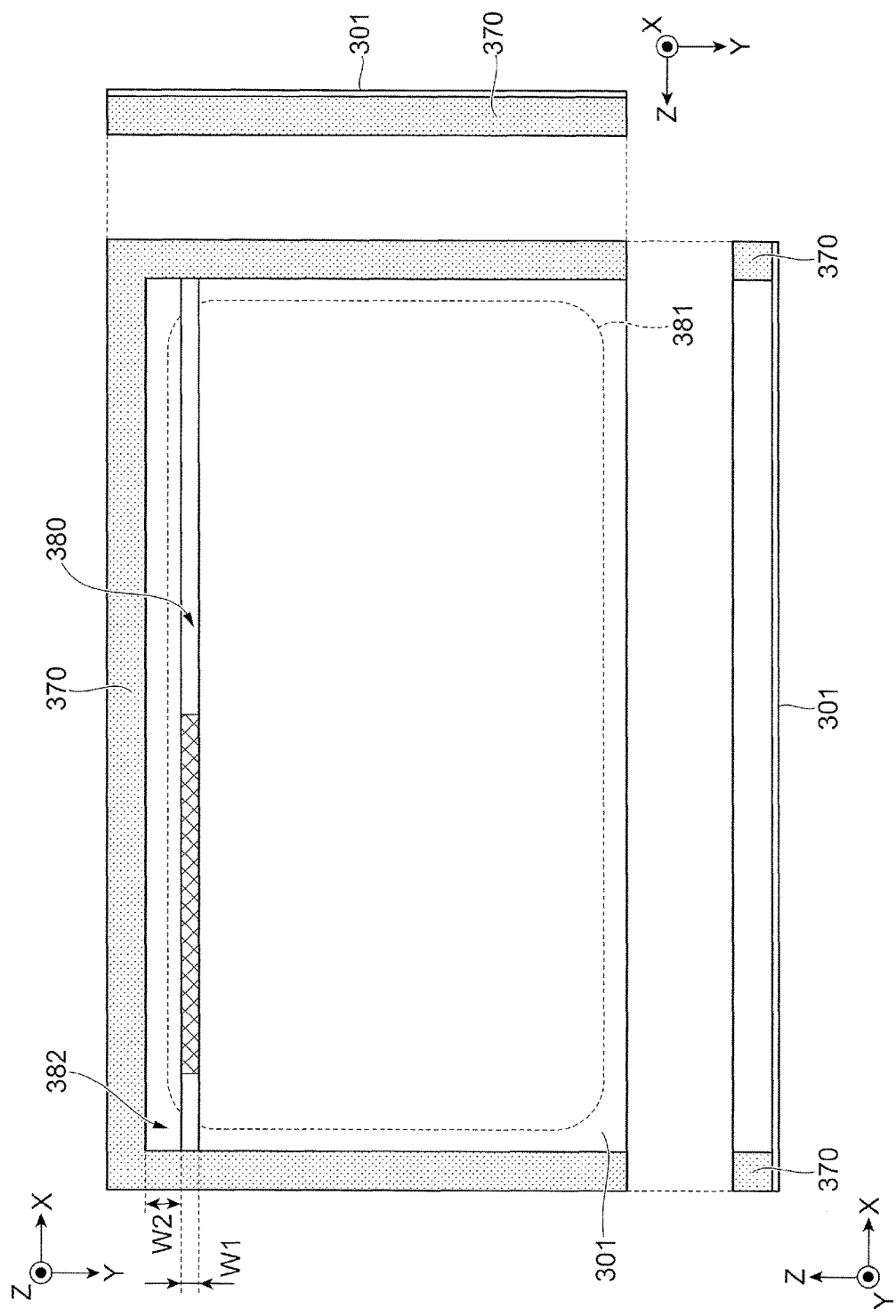
FIG. 7 illustrates another layout example of the scroll bar used for moving the display region in the horizontal direction.

FIG. 7 illustrates another layout example of the scroll bar 380 used for moving the display region in the horizontal direction.

In FIG. 7, the scroll bar 380 extends along the upper side of the display unit 301 at which the frame 370 is disposed.

A gap 382 having a width W2 is disposed between the upper edge of the scroll bar 380 and the frame 370 located at the upper side of the display unit 301. In other words, the display position of the scroll bar 380 is shifted away from the frame 370.

The gap 382 is an example of a third region. The width W2 may be a value based on which the user may operate the scroll bar 380 without being conscious of the presence of the frame 370. A specific value is empirically set in view of, for example, the height of the frame 370.

FIG. 7 is an example in which the region 381 that displays the contents and the region that displays the scroll bar 380 are arranged in an overlapping manner. In FIG. 7, the gap 382 is a part of the region 381 that displays the contents. Therefore, the gap 382 is also a region not used for inputting a command with respect to the contents.

In this layout example, the display width W1 of the scroll bar 380 is a standard size. Because the gap 382 is provided between the frame 370 and the scroll bar 380 in this layout example, the user may readily operate the scroll bar 380 even if the display width W1 of the scroll bar 380 is a standard size.

Third Layout Example

Figure 8:
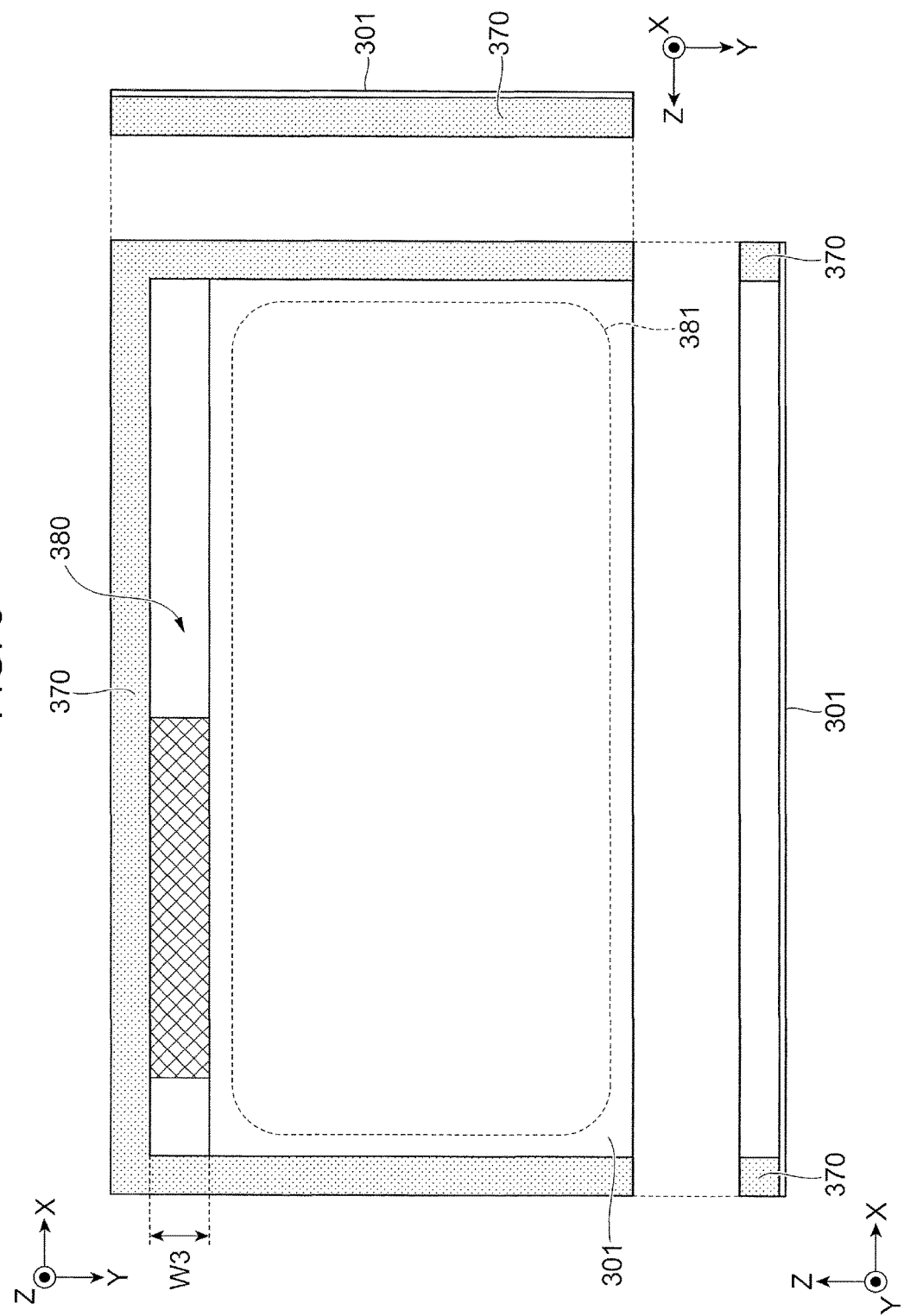
FIG. 8 illustrates another layout example of the scroll bar used for moving the display region in the horizontal direction.

FIG. 8 illustrates another layout example of the scroll bar 380 used for moving the display region in the horizontal direction.

In FIG. 8, the scroll bar 380 extends along the upper side of the display unit 301 at which the frame 370 is disposed.

The scroll bar 380 has an expanded width W3, which is an expanded size. The expanded width W3 is set to a value based on which the user's fingertip touches the scroll bar 380 even when the user psychologically tries to avoid the frame 370. Although a specific value is empirically set in view of, for example, the height of the frame 370, the expanded width W3 is set to, for example, a value obtained by adding together the display width W1, which is a standard size, shown in FIG. 7 and the width W2 of the gap 382.

FIG. 8 is an example in which the region 381 that displays the contents and the region that displays the scroll bar 380 are arranged parallel to each other.

In this layout example, the scroll bar 380 is displayed with the expanded width W3, which is an expanded size, so that the user may readily operate the scroll bar 380 even if the frame 370 is provided along the upper side of the display unit 301.

Fourth Layout Example

Figure 9:
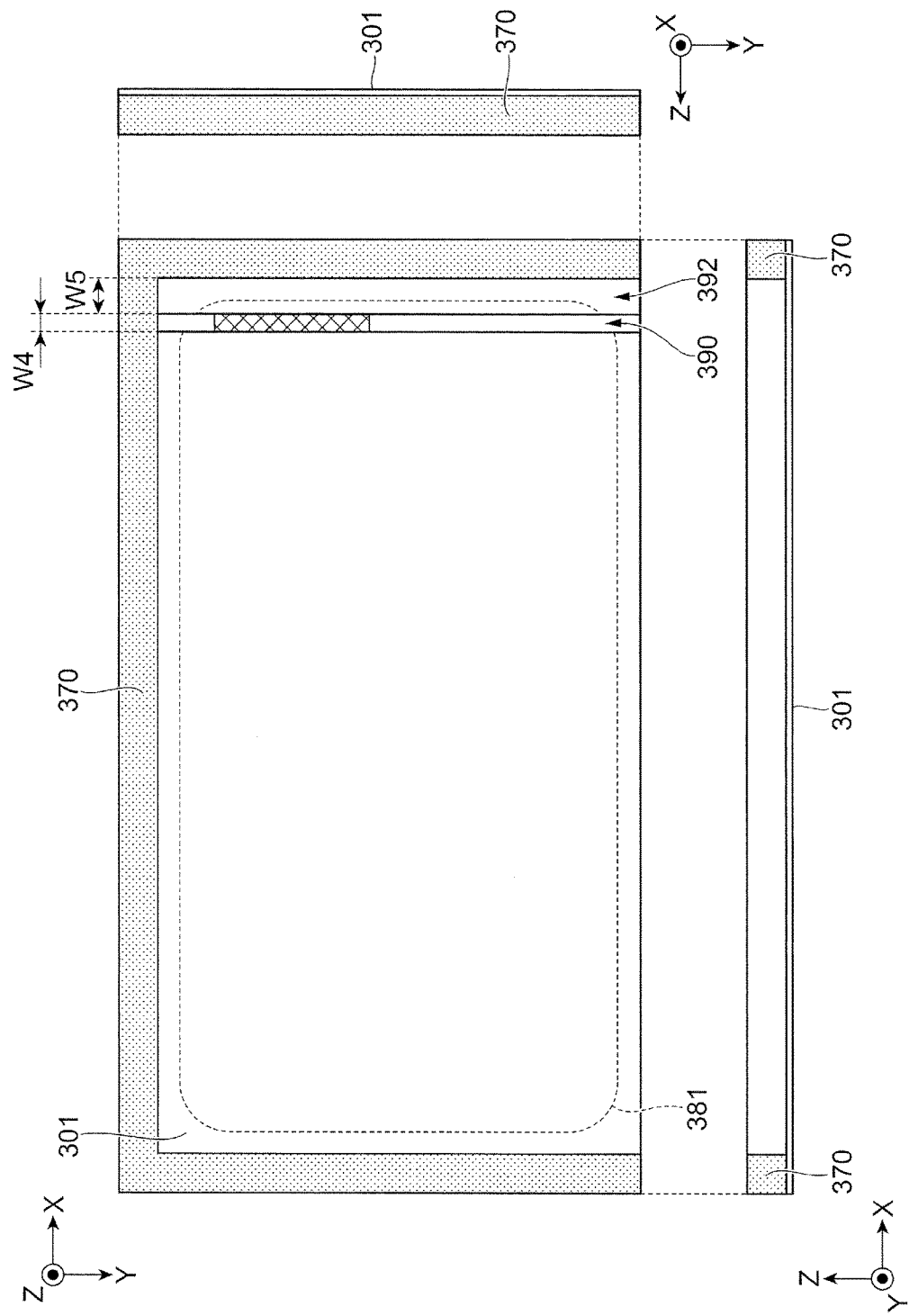
FIG. 9 illustrates a layout example of a scroll bar used for moving the display region in the vertical direction.

FIG. 9 illustrates a layout example of a scroll bar 390 used for moving the display region in the vertical direction.

In FIG. 9, the scroll bar 390 is disposed at the right side of the display unit 301 at which the frame 370 is disposed.

A gap 392 having a width W5 is disposed between the right edge of the scroll bar 390 and the frame 370 located at the right side of the display unit 301. In other words, the display position of the scroll bar 390 is shifted away from the frame 370 disposed at the right side of the display unit 301.

The gap 392 is an example of a third region. The width W5 may be a value based on which the user may operate the scroll bar 390 without being conscious of the presence of the frame 370. A specific value is empirically set in view of, for example, the height of the frame 370.

FIG. 9 is an example in which the region 381 that displays the contents and the region that displays the scroll bar 390 are arranged in an overlapping manner. In FIG. 9, the gap 392 is a part of the region 381 that displays the contents. Therefore, the gap 392 is also a region not used for inputting a command with respect to the contents.

In this layout example, a display width W4 of the scroll bar 390 is a standard size. Because the gap 392 is provided between the frame 370 and the scroll bar 390 in this layout example, the user may readily operate the scroll bar 390 even if the display width W4 of the scroll bar 390 is a standard size.

Fifth Layout Example

Figure 10:
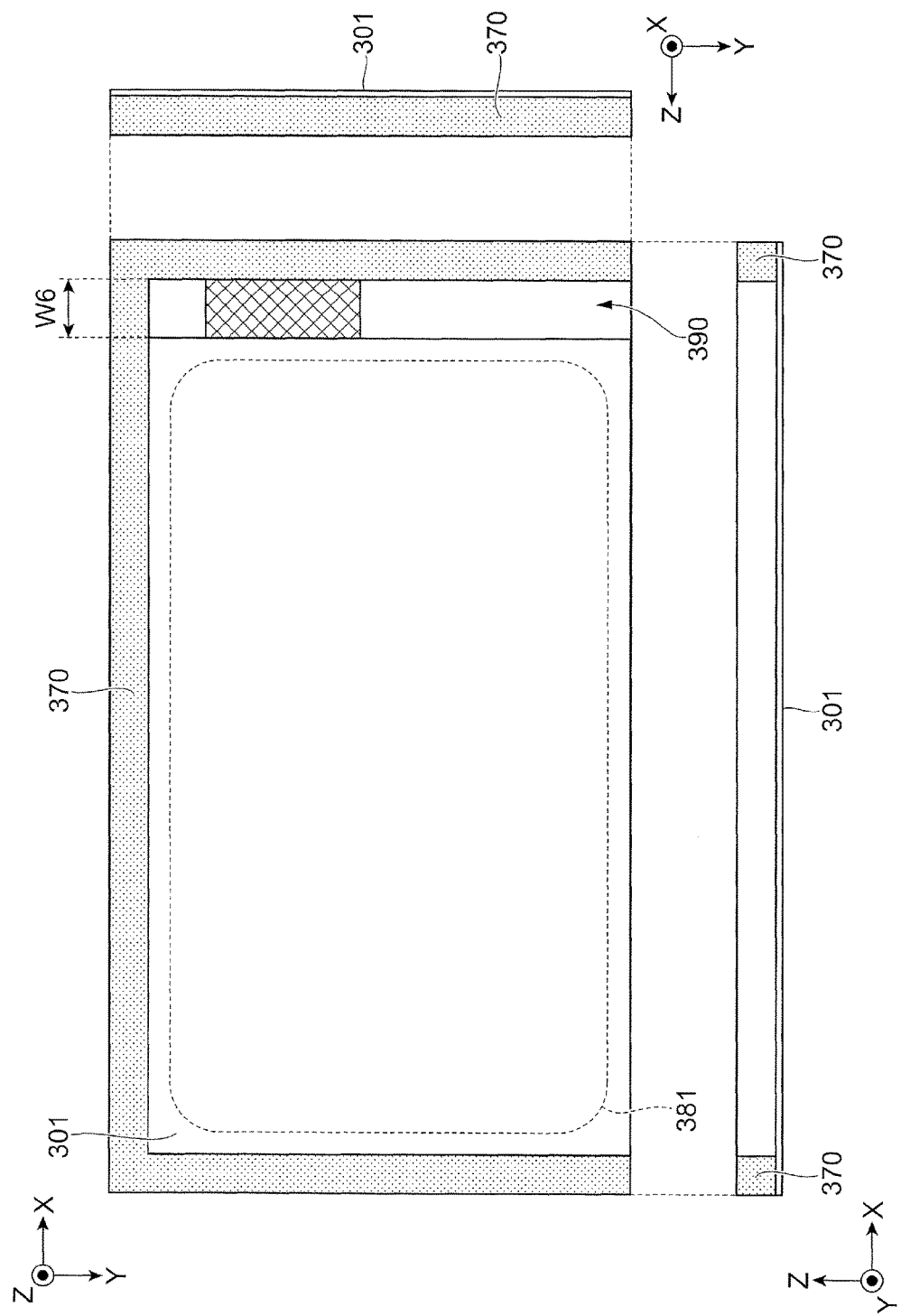
FIG. 10 illustrates another layout example of the scroll bar used for moving the display region in the vertical direction.

FIG. 10 illustrates another layout example of the scroll bar 390 used for moving the display region in the vertical direction.

In FIG. 10, the scroll bar 390 extends along the right side of the display unit 301 at which the frame 370 is disposed.

In FIG. 10, the scroll bar 390 has an expanded width W6, which is an expanded size. The expanded width W6 is set to a value based on which the user's fingertip touches the scroll bar 390 even when the user psychologically tries to avoid the frame 370. Although a specific value is empirically set in view of, for example, the height of the frame 370, the expanded width W6 is set to, for example, a value obtained by adding together the display width W4, which is a standard size, shown in FIG. 9 and the width W5 of the gap 392.

FIG. 10 is an example in which the region 381 that displays the contents and the region that displays the scroll bar 390 are arranged parallel to each other.

In this layout example, the scroll bar 390 is displayed with the expanded width W6, which is an expanded size, so that the user may readily operate the scroll bar 390 even if the frame 370 is provided along the right side of the display unit 301.

Second Exemplary Embodiment

In the first exemplary embodiment, a contact-type coordinate input device is used for detecting an operation input. In this exemplary embodiment, a noncontact-type coordinate input device is used for detecting an operation input.

Figure 11:
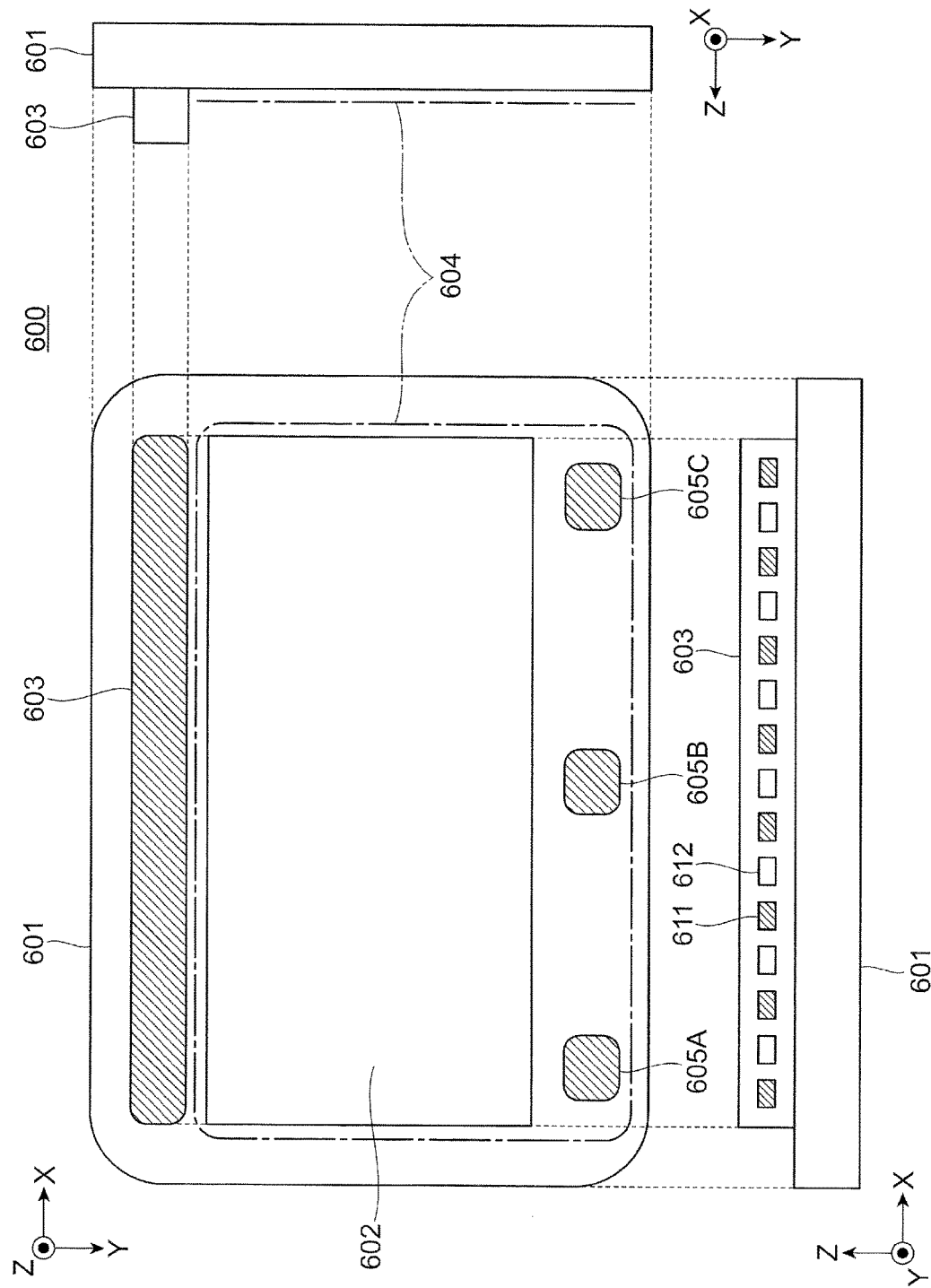
FIG. 11 is an external view of a tablet-type information terminal according to a second exemplary embodiment.

FIG. 11 is an external view of a tablet-type information terminal 600 according to a second exemplary embodiment.

The information terminal 600 is an example of an information processing apparatus. The information terminal 609 may be, for example, a smartphone or a gaming apparatus.

An upper surface of an apparatus body 601 of the information terminal 600 is provided with a display unit 602 that displays a display image and a coordinate detection sensor 603 that optically detects an operated position of an input object.

The coordinate detection sensor 603 is an example of a noncontact-type coordinate input device and is disposed so as to extend along one of the sides of the display unit 602. As shown in FIG. 11, the coordinate detection sensor 603 is installed so as to protrude from the upper surface of the apparatus body 601. In this example, the position where the coordinate detection sensor 603 is installed in the apparatus body 601 is fixed.

On a side surface of the coordinate detection sensor 603 provided with the display unit 602, light-emitting elements 611 that emit light and light-receiving elements 612 that receive light are alternately arranged, thereby forming a detection plane 604, which is parallel to the upper surface, in the space above the apparatus body 601. The detection plane 604 is an example of a detection region. In this case, a housing of the coordinate detection sensor 603 that accommodates these optical components serves as an example of a protrusion.

In this exemplary embodiment, the light-emitting elements 611 are formed of, for example, light-emitting diodes (LEDs) that output infrared light. The light-receiving elements 612 are formed of, for example, photodiodes (PDs) that receive reflection light reflected from an input object (e.g., a finger or a en) moving across the detection plane 604.

As shown in FIG. 11, the light-emitting elements 611 and the light-receiving elements 612 are alternately arranged in a line. The sizes and positions of the light-emitting elements 611 and the light-receiving elements 612 in FIG. 11 are enlarged for illustrative purposes. In actuality, the light-emitting elements 611 and the light-receiving elements 612 are arranged with the size and density according to the requested detection accuracy.

Figure 12:
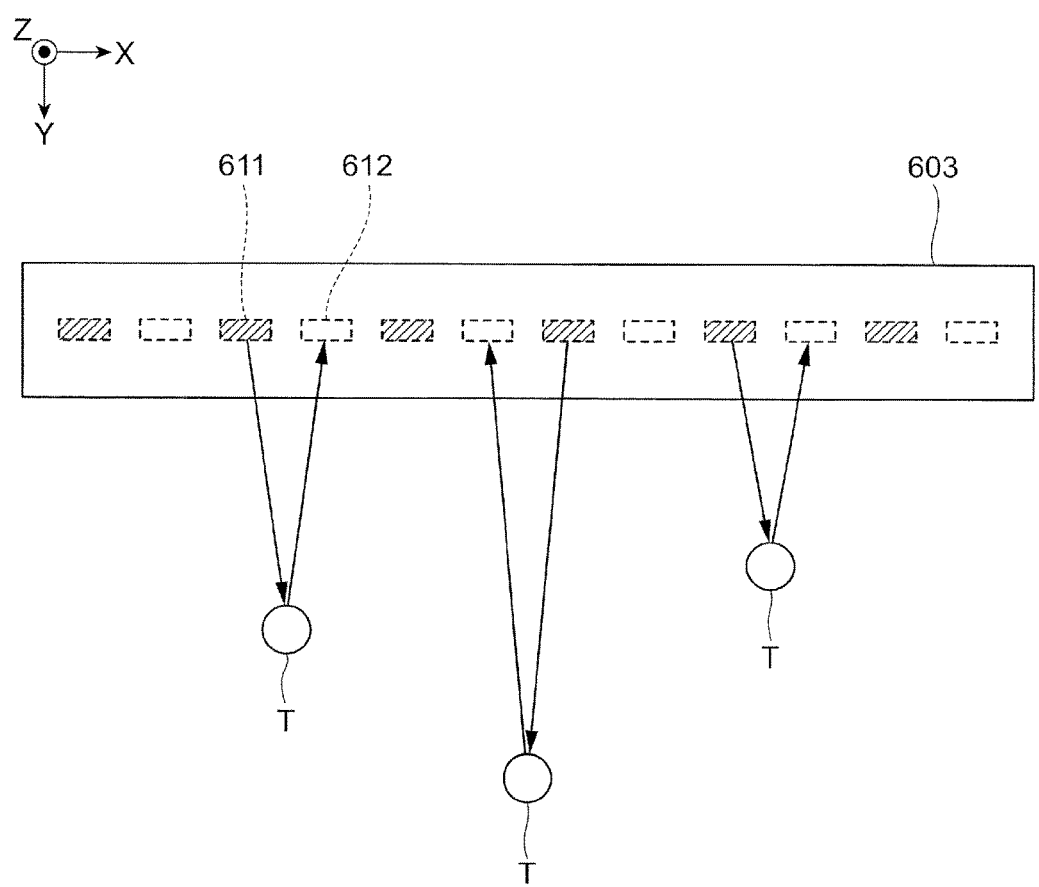
FIG. 12 illustrates how a coordinate detection sensor detects an input object.

FIG. 12 illustrates how the coordinate detection sensor 603 detects an input object T.

The coordinate detection sensor 603 used in this exemplary embodiment determines the position of the input object T in the direction in which the light-emitting elements 611 and the light-receiving elements 612 are arranged (i.e., an X-axis direction) in accordance with whether the reflection light from the input object T is detected by the light-receiving elements 612.

Moreover, the coordinate detection sensor 603 determines the position of the input object T in the direction away from the coordinate detection sensor 603 (i.e., a Y-axis direction) in accordance with the intensity of the light received by the light-receiving elements 612.

By utilizing the properties in which the intensity of the light received by the light-receiving elements 6142 increases as the input object T moves toward the coordinate detection sensor 603 and the intensity of the light received by the light-receiving elements 612 decreases as the input object T moves away from the coordinate detection sensor 603, the coordinate detection sensor 603 determines the distance between the coordinate detection sensor 603 and the input object T.

The coordinate detection sensor 603 is capable of detecting multiple input objects T at once. Therefore, so-called multi-touch detection is possible.

Referring back to FIG. 11, because the coordinate detection sensor 603 used in this exemplary embodiment is of an optical type, the detection plane 604 is capable of detecting not only an operation input to an operator displayed on the display unit 602 but also an operation input to an icon (e.g., a back button 605A, a home button 605B, or a multitask button 605C) printed on the upper surface of the apparatus body 601.

These icons are an example of operators. The back button 605A is to be used as a command for, for example, returning the page screen displayed on the display unit 602 back to a preceding page. The home button 605B is to be used as a command for returning to a preregistered home screen. The multitask button 605C is to be used as a command for displaying a menu list or an application list.

The functions allocated to the icons are merely examples.

Hardware Configuration of Information Terminal

Figure 13:
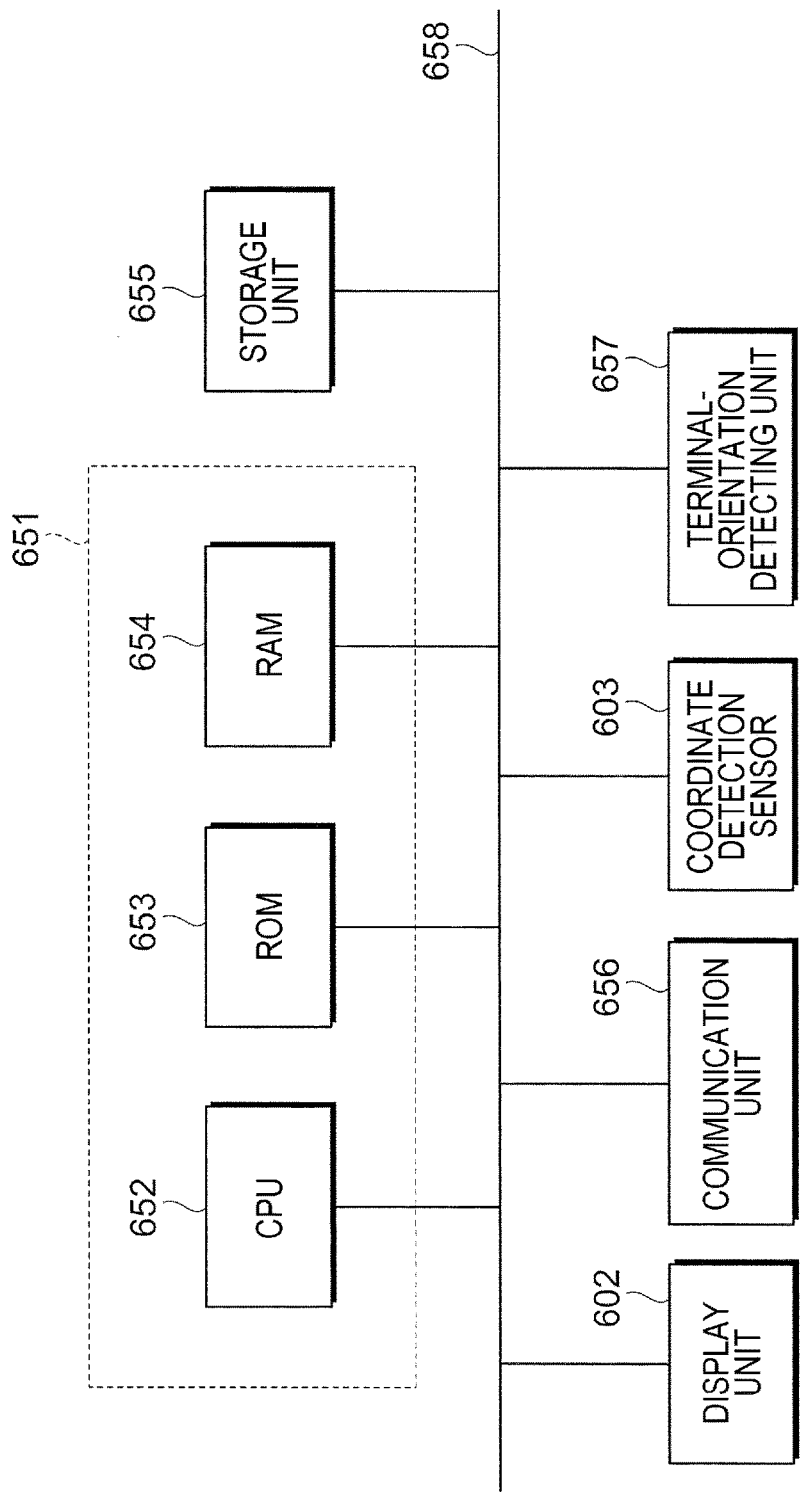
FIG. 13 illustrates an example of a functional block configuration of a controller and other devices constituting the information terminal.

FIG. 13 illustrates an example of a functional block configuration of a controller 651 and other devices constituting the information terminal 600.

The information terminal 600 has the controller 651 that controls the entire apparatus, the display unit 602 used for displaying an image, the coordinate detection sensor 603 that detects the coordinate position of an input object moving across the detection plane 604, a storage unit 655 used for storing various types of data and programs, a communication unit 656 used for communication with an external device, and a terminal-orientation detecting unit 657 that detects the orientation of the apparatus body 601 when in use.

These units are connected to one another by, for example, a bus 658 and exchange data via the bus 658.

The controller 651 includes a CPU 652, a ROM 653, and a RAM 654. The ROM 653 stores a program to be executed by the CPU 652. The CPU 652 uses the RAM 654 as a work area and executes the program read from the ROM 653. By executing the program, the units the information terminal 600 are controlled.

The controller 651 in this exemplary embodiment provides the function of an input device together with the coordinate detection sensor 603.

The display unit 602 is formed of, for example, a liquid-crystal display panel or an organic electroluminescence (EL) display panel. In this exemplary embodiment, a contact-type coordinate input device, as in the first exemplary embodiment, is not provided.

The coordinate detection sensor 603 is integrally attached to the surface of the apparatus body 601.

The storage unit 655 is formed of a storage device, such as a hard disk device or a semiconductor memory.

The communication unit 656 is formed of, for example, a wireless local-area-network (LAN) interface.

The terminal-orientation detecting unit 657 includes, for example, an acceleration sensor and a geomagnetic sensor. In this exemplary embodiment, assuming that the side of the apparatus body 601 at which the coordinate detection sensor 603 is disposed is defined as an upper edge, the roll about the Y axis (see FIG. 11), the pitch about the X axis (see FIG. 11), and the azimuth about the Z axis (see FIG. 11) are detected.

The terminal-orientation detecting unit 657 uses the rotational information and azimuth information about these axes to detect which side of the apparatus body 601 corresponds to the upper side on the display.

Operation-Input-Detection Functional Unit

Next, an operation-input-detection functional unit according to this exemplary embodiment will be described. The operation-input-detection functional unit according to this exemplary embodiment is an example of a function provided by the input device and is realized in accordance with cooperation between the controller 651 and the coordinate detection sensor 603.

The controller 651 according to this exemplary embodiment receives information related to the position and movement of an input object in the detection region (e.g., an output column of detection coordinates) from the coordinate detection sensor 603 and detects the contents of an operation input by the user based on the positional relationship with individual detection ranges allocated to operators (e.g., a software button, an icon, an operation bar, and a menu bar) to be operated by the user.

Figure 14:
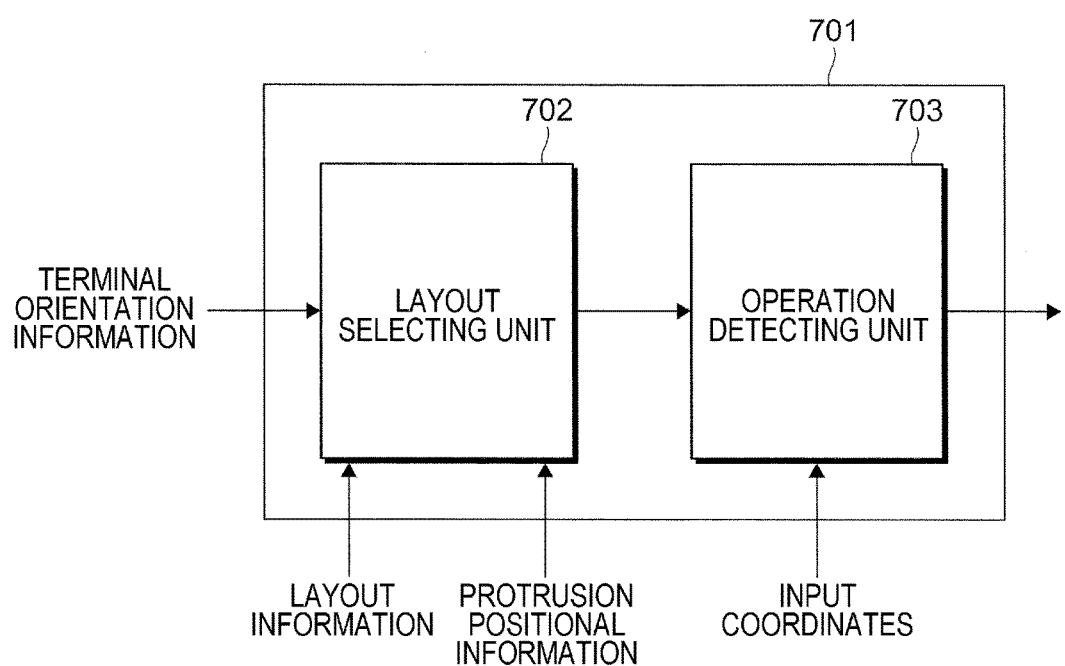
FIG. 14 illustrates an operation-input-detection functional unit used in the second exemplary embodiment.

FIG. 14 illustrates an operation-input-detection functional unit 701 used in the second exemplary embodiment.

The operation-input-detection functional unit 701 according to this exemplary embodiment has a layout selecting unit 702 that selects the positional layout of operators based on information indicating the orientation of the terminal (terminal orientation information), layout information of a display image, and positional information of a protrusion (protrusion positional information), and also has an operation detecting unit 703 that compares the coordinates (input coordinates) detected by the coordinate detection sensor 603 with the detection range of each operator so as to detect the contents of an operation input.

In this exemplary embodiment, the protrusion positional information indicating the installation position of the coordinate detection sensor 603 is provided as the upper side of the display unit 602.

Figure 15:
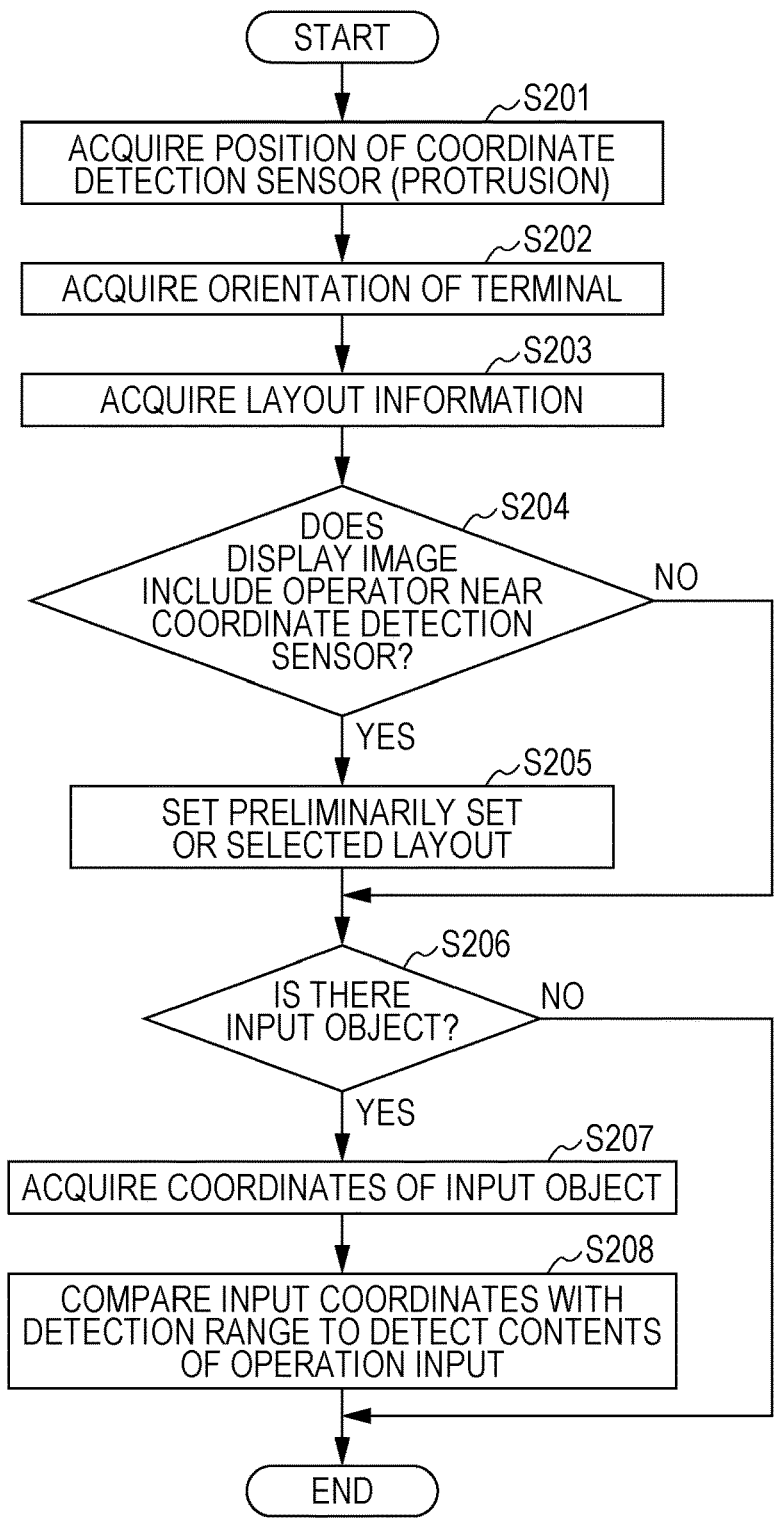
FIG. 15 is a flowchart illustrating an example of a detecting operation executed by the operation-input-detection functional unit.

FIG. 15 is a flowchart illustrating an example of a detecting operation executed by the operation-input-detection functional unit 701.

The operation by the operation-input-detection functional unit 701 is executed in two stages. The first-stage operation is executed every time the display screen is switched and is for selecting the layout of an operator, such as a scroll bar, for receiving a command input with respect to the display image (contents) displayed on the display unit 602. The first-stage operation is executed by the layout selecting unit 702. The second-stage operation is executed every time a new operation input by an input object is detected. The second-stage operation is detected by the operation detecting unit 703.

First, in step S201, the layout selecting unit 702 acquires the position of the coordinate detection sensor 603 as a protrusion. As mentioned above, the upper side of the display unit 602 is the position of the coordinate detection sensor 603.

Then, in step S202, the layout selecting unit 702 acquires, from the terminal-orientation detecting unit 657, which side of the apparatus body 601 corresponds to the upper side of the display.

Subsequently, in step S203, the layout selecting unit 702 acquires the layout information of the display image.

In step S204, the layout selecting unit 702 determines whether or not there is an operator disposed near the coordinate detection sensor 603. The layout selecting unit 702 obtains a positive result if the distance between the display position of the operator and the coordinate detection sensor 603 is smaller than a predetermined reference distance, or obtains a negative result if the distance is larger than or equal to the reference distance. The reference distance used for the determination may be changeable by the user.

If a positive result is obtained in step S204, the layout selecting unit 702 proceeds to step S205 to set a preliminarily set or selected layout. In this exemplary embodiment, one or multiple layout candidates related to the layout of the operators are prepared, and the layout selecting unit 702 sets one of the prepared candidates as a layout to be used for the display. The layout of the operators may be selectable in accordance with user's preference. A detailed example of the layout candidates will be described later.

If a negative result is obtained in step S204, the layout is not to be changed.

When the layout to be used for displaying the display image is completely set, the operation detecting unit 703 determines in step S206 whether or not there is an input object (e.g., a fingertip or a pen) based on whether or not there are input coordinates.

If there are no input coordinates to begin with or if the detected input coordinates have disappeared, the operation detecting unit 703 obtains a negative result and ends the detecting operation being executed. When the detecting operation ends, a new detecting operation commences.

If an input object is detected from the input coordinates, the operation detecting unit 703 acquires the coordinates of the input object in step S207. The operation detecting unit 703 acquires multiple coordinate sequences (movement trajectories) sampled for individual input objects that have been recognized.

In step S208, the operation detecting unit 703 compares the acquired input coordinates with the detection range set for each operator so as to detect the contents of the operation input. The detection ranges are associated with the positions of the respective operators on the display.

When the input coordinates are included in any of the detection ranges and a command, such as a click, is detected, the operation detecting unit 703 regards the operation performed on the corresponding operator as being effective.

Layout Candidate Examples

Examples of layout candidates set by the layout selecting unit 702 according to this exemplary embodiment will be described below with reference to FIGS. 16 to 20. The following description relates to a case where the operator is a scroll bar.

First Layout Example

Figure 16:
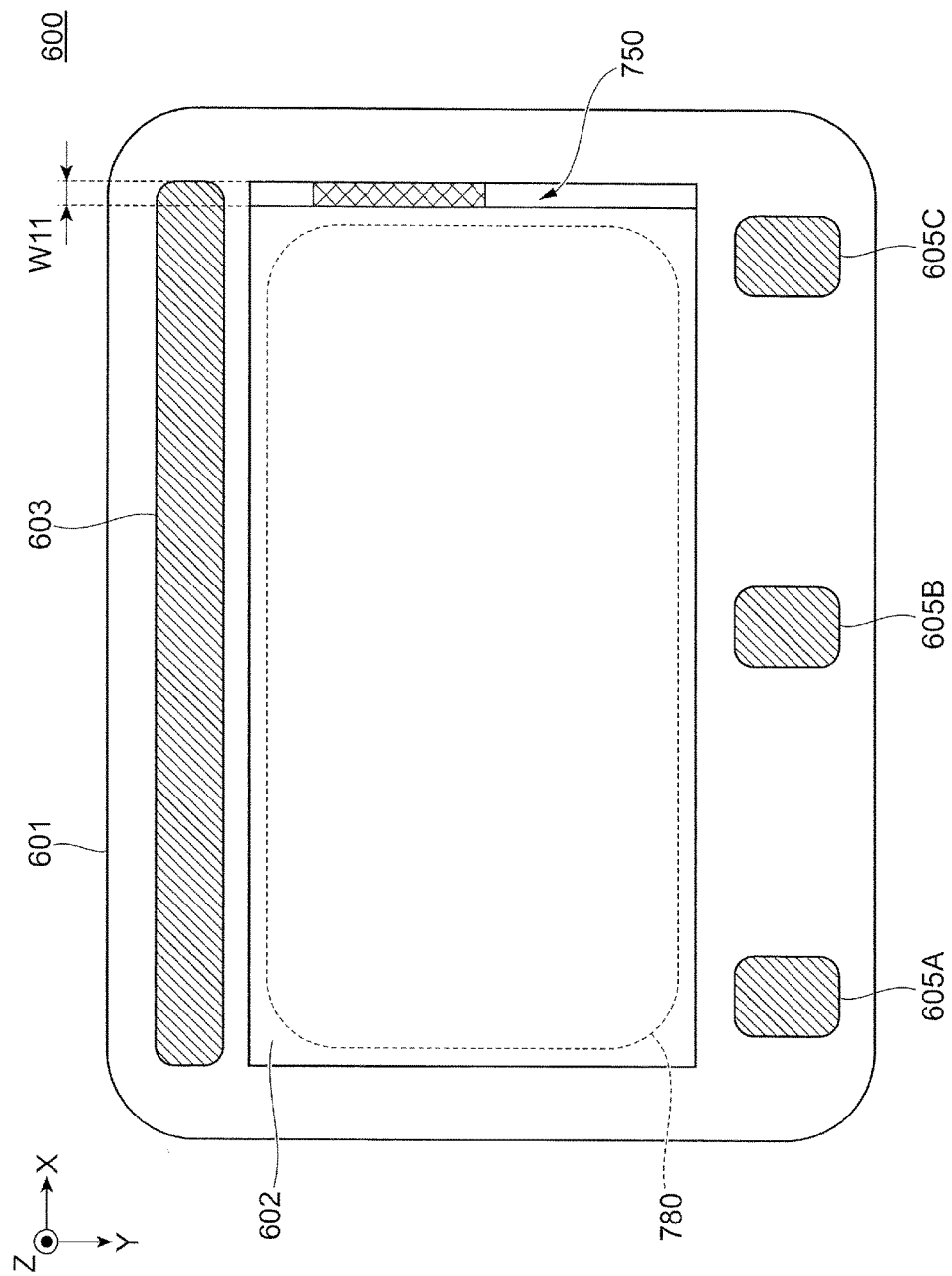
FIG. 16 illustrates a layout example of a scroll bar used for moving the display region in the vertical direction.

FIG. 16 illustrates a layout example of a scroll bar 750 used for moving the display region in the vertical direction. In FIG. 16, the coordinate detection sensor 603 is located at the upper side toward the plane of the drawing. Specifically, the orientation of the apparatus body 601 is the same as that in FIG. 11.

In FIG. 16, the scroll bar 750 extends along the right side of the display unit 602 at which the coordinate detection sensor 603 is not disposed.

FIG. 16 illustrates an example in which a region 780 that displays the contents and a region that displays the scroll bar 750 are arranged parallel to each other.

A display width W11 of the scroll bar 750 is a standard size. In this case, a standard size refers to the original display width prepared in a display image and is narrower than an expanded size (expanded width W14) after expansion, which will be described later.

In the layout shown in FIG. 16, the coordinate detection sensor 603 does not exist at the right side of the display unit 602 where the scroll bar 750 is disposed, so that the user may operate the scroll bar 750 with no difficulty even if the scroll bar 750 is of a standard size.

Second Layout Example

Figure 17:
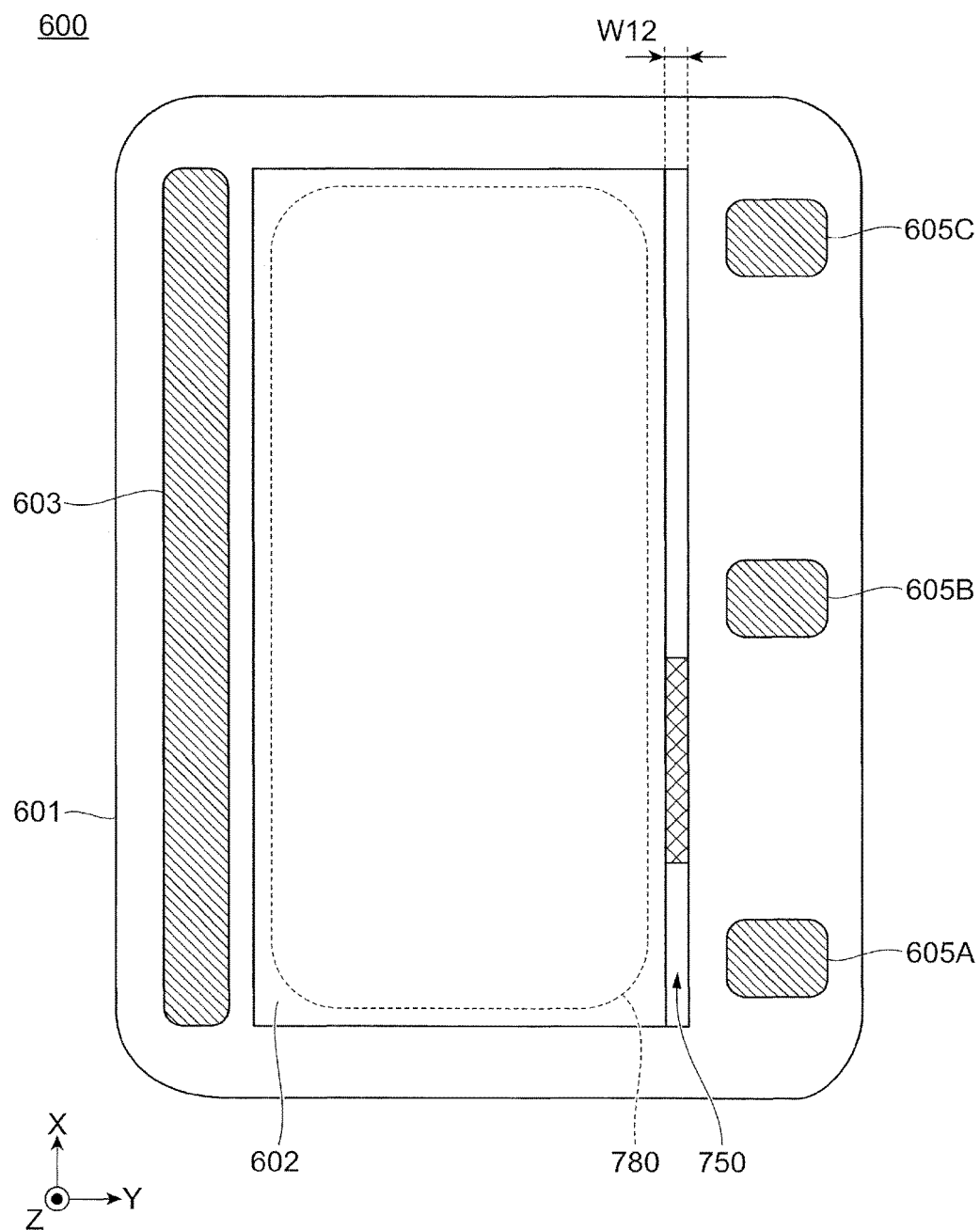
FIG. 17 illustrates another layout example of the scroll bar used for moving the display region in the vertical direction.

FIG. 17 illustrates another layout example of the scroll bar 750 used for moving the display region in the vertical direction. In FIG. 17, the coordinate detection sensor 603 is located at the left side toward the plane of the drawing. Specifically, the apparatus body 601 is rotated counterclockwise by 90° from the state in FIG. 16.

In FIG. 17, the scroll bar 750 extends along the right side of the display unit 602 at which the coordinate detection sensor 603 is not disposed. In other words, the scroll bar 750 extends along a side opposite from the coordinate detection sensor 603.

In this exemplary embodiment, since the orientation of the apparatus body 601 is ascertained from an output from the terminal-orientation detecting unit 657 (the orientation of the coordinate detection sensor 603 as viewed from the user is also ascertained), the layout selecting unit 702 sets the scroll bar 750 at the side opposite from the coordinate detection sensor 603.

FIG. 17 also illustrates an example in which the region 780 that displays the contents and the region that displays the scroll bar 750 are arranged parallel to each other.

Although a display width W12 of the scroll bar 750 in FIG. 17 is a standard size, the user may operate the scroll bar 750 with no difficulty since the coordinate detection sensor 603 does not exist at the right side of the display unit 602.

Third Layout Example

Figure 18:
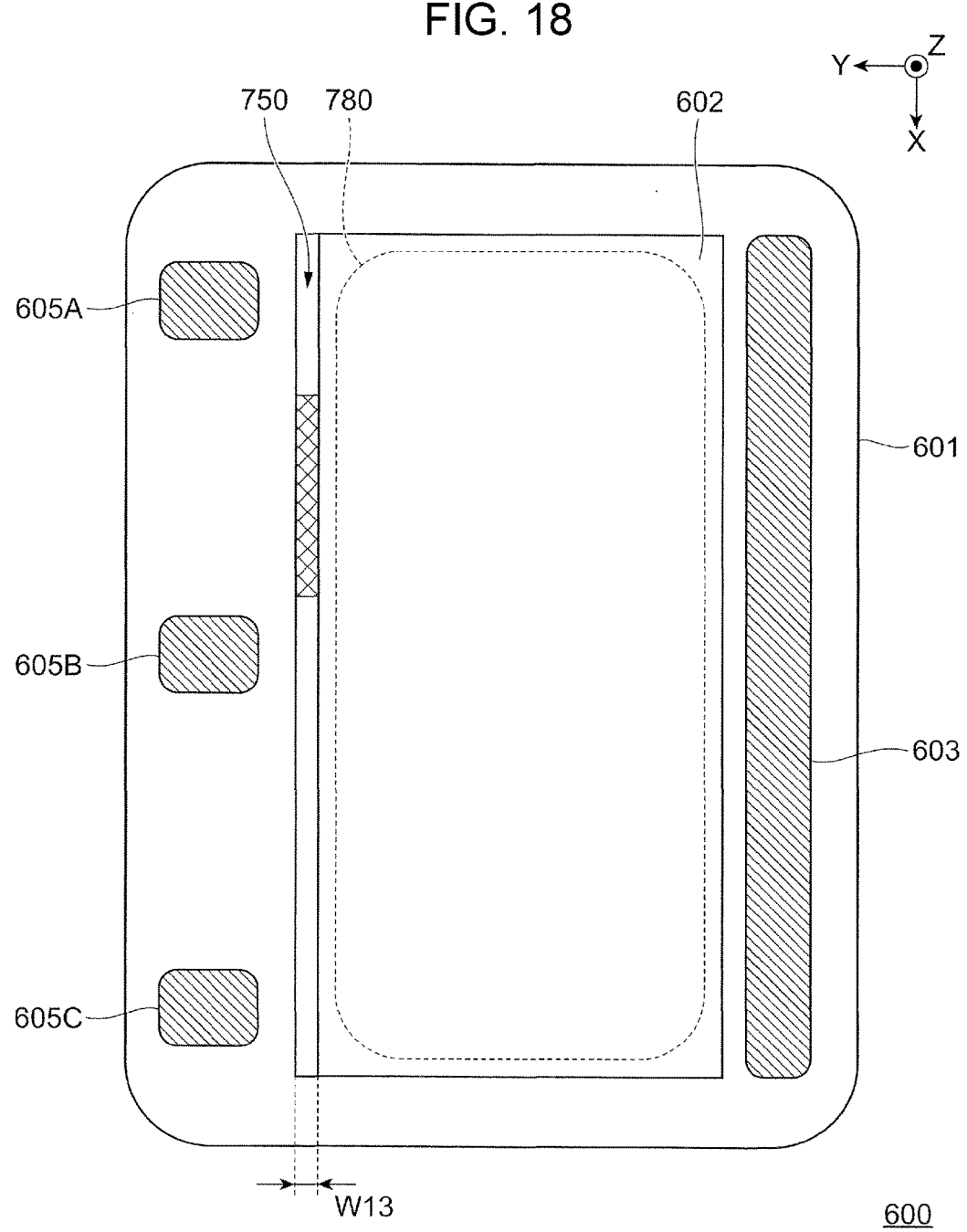
FIG. 18 illustrates another layout example of the scroll bar used for moving the display region in the vertical direction.

FIG. 18 illustrates another layout example of the scroll bar 750 used for moving the display region in the vertical direction. In FIG. 18, the coordinate detection sensor 603 is located at the right side toward the plane of the drawing. Specifically, the apparatus body 601 is rotated clockwise by 90° from the state in FIG. 16.

With regard to the orientation of the apparatus body 601 in the third layout example, the rotational direction is the opposite from that of the apparatus body 601 in the second layout example.

In FIG. 18, the scroll bar 750 extends along the left side of the display unit 602 at which the coordinate detection sensor 603 is not disposed. In other words, the scroll bar 750 extends along a side opposite from the coordinate detection sensor 603.

In this exemplary embodiment, since the orientation of the apparatus body 601 is ascertained from an output from the terminal-orientation detecting unit 657 (the orientation of the coordinate detection sensor 603 as viewed from the user is also ascertained), the layout selecting unit 702 sets the scroll bar 750 at the side opposite from the coordinate detection sensor 603.

FIG. 18 also illustrates an example in which the region 780 that displays the contents and the region that displays the scroll bar 750 are arranged parallel to each other.

Although a display width W13 of the scroll bar 750 in FIG. 18 is a standard size, the user may operate the scroll bar 750 with no difficulty since the coordinate detection sensor 603 does not exist at the left side of the display unit 602.

Fourth Layout Example

Figure 19:
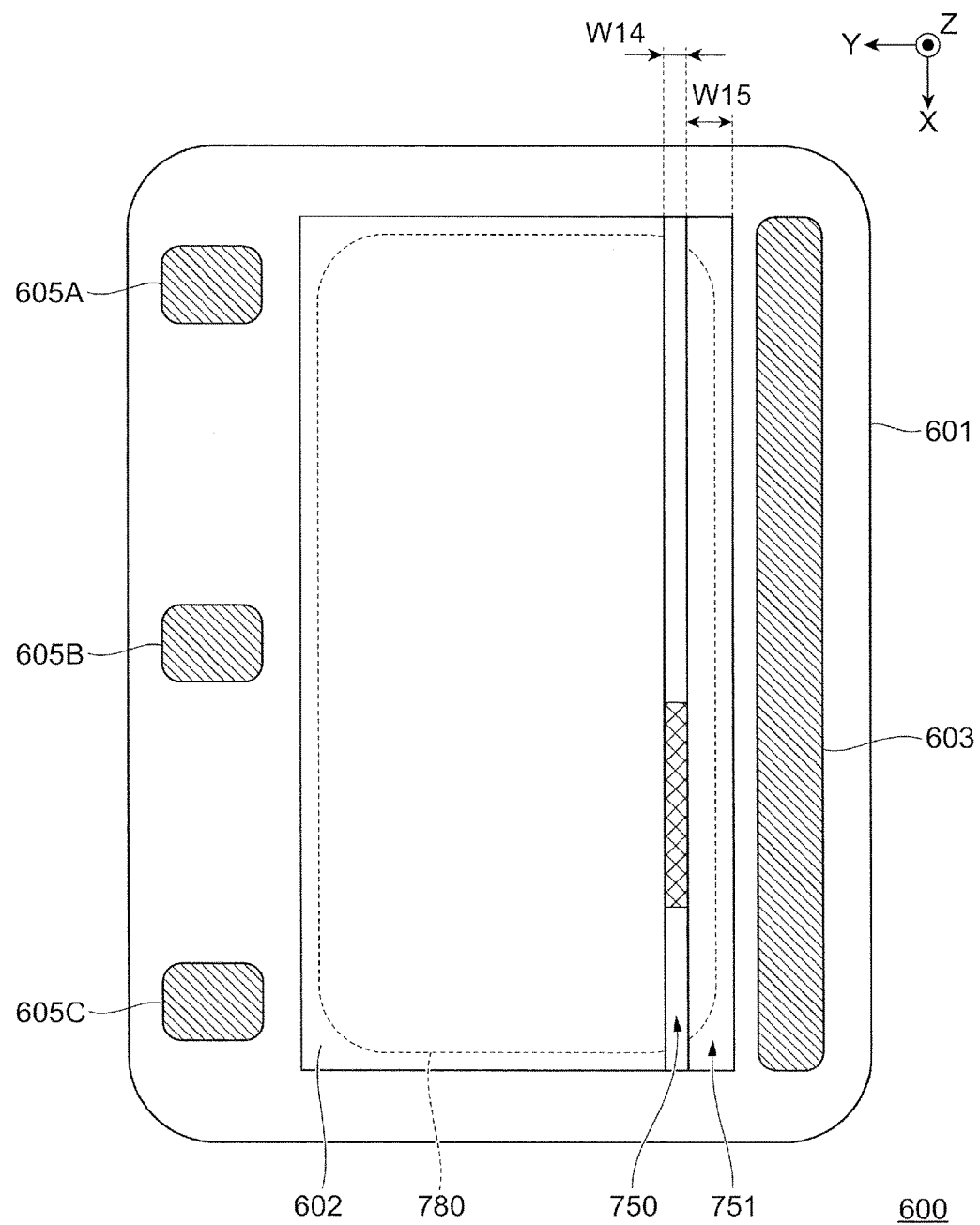
FIG. 19 illustrates another layout example of the scroll bar used for moving the display region in the vertical direction.

FIG. 19 illustrates another layout example of the scroll bar 750 used for moving the display region in the vertical direction.

In the third layout example, the scroll bar 750 is disposed at the left side where the coordinate detection sensor 603 is not provided. In contrast, in this layout example, the scroll bar 750 is disposed at the right side, similarly to the coordinate detection sensor 603.

A gap 751 having a width W15 is disposed between the right edge of the scroll bar 750 and the coordinate detection sensor 603. In other words, the scroll bar 750 is shifted away from the coordinate detection sensor 603.

The gap 751 is an example of a third region. The width W15 may be a value based on which the user may operate the scroll bar 750 without being conscious of the presence of the coordinate detection sensor 603. A specific value is empirically set in view of, for example, the height of the coordinate detection sensor 603.

FIG. 19 is an example in which the region 780 that displays the contents and the region that displays the scroll bar 750 are arranged in an overlapping manner. In FIG. 19, the gap 751 is a part of the region 780 that displays the contents. Therefore, the gap 751 is also a region not used for inputting a command with respect to the contents.

In this layout example, a display width W14 of the scroll bar 750 is a standard size. Because the gap 751 is provided between the coordinate detection sensor 603 and the scroll bar 750 in this layout example, the user may readily operate the scroll bar 750 even if the display width W14 of the scroll bar 750 standard size.

Fifth Layout Example

Figure 20:
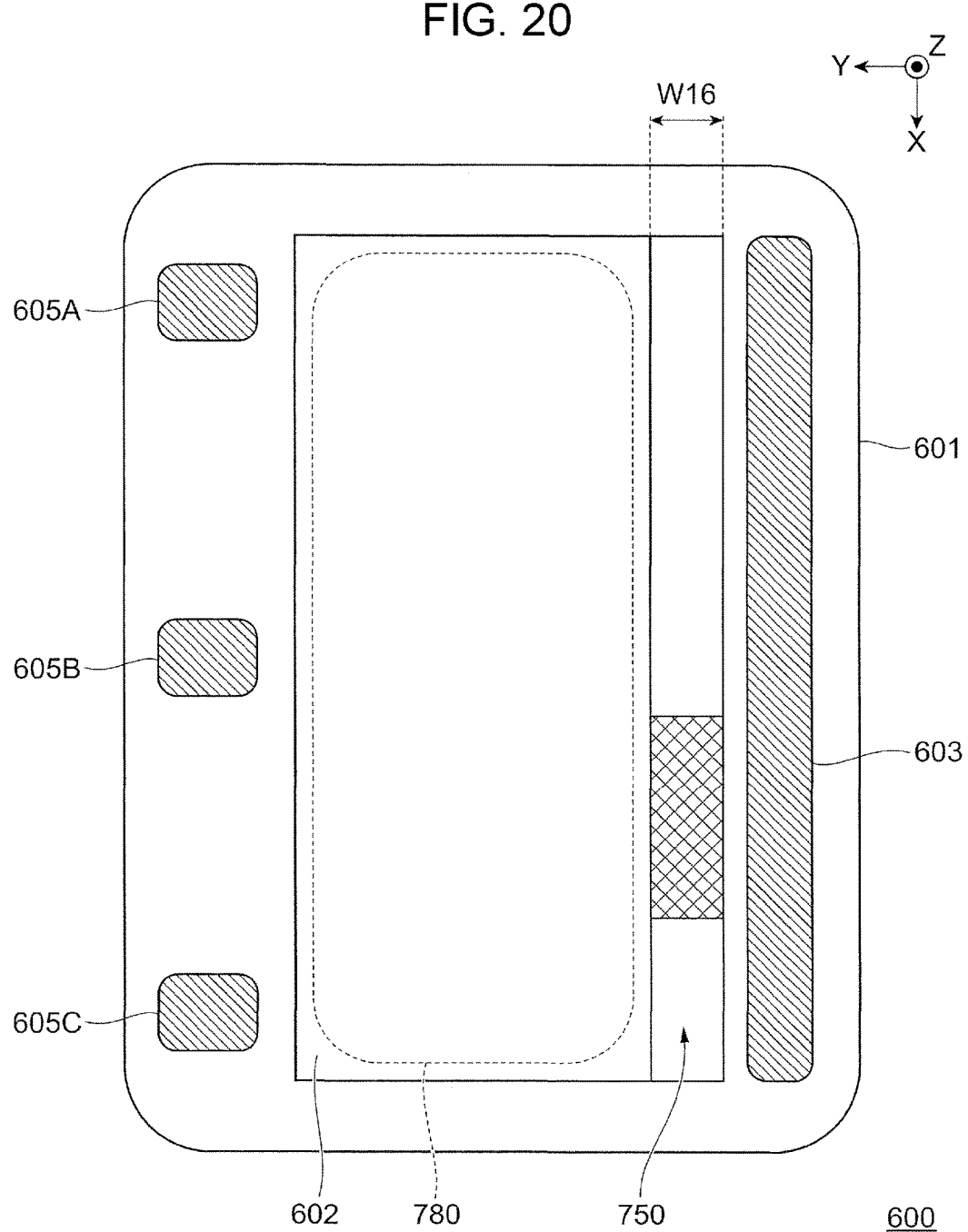
FIG. 20 illustrates another layout example of the scroll bar used for moving the display region in the vertical direction.

FIG. 20 illustrates another layout example of the scroll bar 750 used for moving the display region in the vertical direction.

In this layout example, the scroll bar 750 is also disposed at the right side, similarly to the coordinate detection sensor 603.

The scroll bar 750 has an expanded width W16, which is an expanded size. The expanded width W16 is set to a value based on which the user's fingertip touches the scroll bar 750 even when the user psychologically tries to avoid the coordinate detection sensor 603. Although a specific value is empirically set in view of, for example, the height of the coordinate detection sensor 603, the expanded width W16 is set to, for example, a value obtained by adding together the display width W14, which is a standard size, and the width W15 of the gap 751.

FIG. 20 is an example in which the region 780 that displays the contents and the region that displays the scroll bar 750 are arranged parallel to each other.

In this layout example, the scroll bar 750 is displayed with the expanded width W16, which is an expanded size, so that the user may readily operate the scroll bar 750 even if the coordinate detection sensor 603 is provided along the right side of the display unit 602

Other Layout Examples

Each of the first to fifth layout examples indicates a layout example of the scroll bar 750 that moves the display region in the vertical direction in accordance with the rotational direction of the information terminal 600. Alternatively, the layout examples may each be applied to a case where the display position of a scroll bar that moves the display region in the horizontal direction is to be changed in accordance with the positional relationship with the coordinate detection sensor 603.

Furthermore, the rotational direction of the apparatus body 601 is not limited to the 90° clockwise direction and the 90° counterclockwise direction. Alternatively, a layout that facilitates the operation of the scroll bar when the apparatus body 601 is to be vertically inverted (i.e., when the apparatus body 601 is to be rotated clockwise or counterclockwise by 180°) may be selected.

Third Exemplary Embodiment

In the above-described exemplary embodiments, the frame 370 (FIG. 6) and the coordinate detection sensor 603 (FIG. 11) as protrusions are both integrated with (fixed to) the apparatus body 601. In this exemplary embodiment, the coordinate detection sensor 603 is attachable to and detachable from the apparatus body 601.

Figure 21:
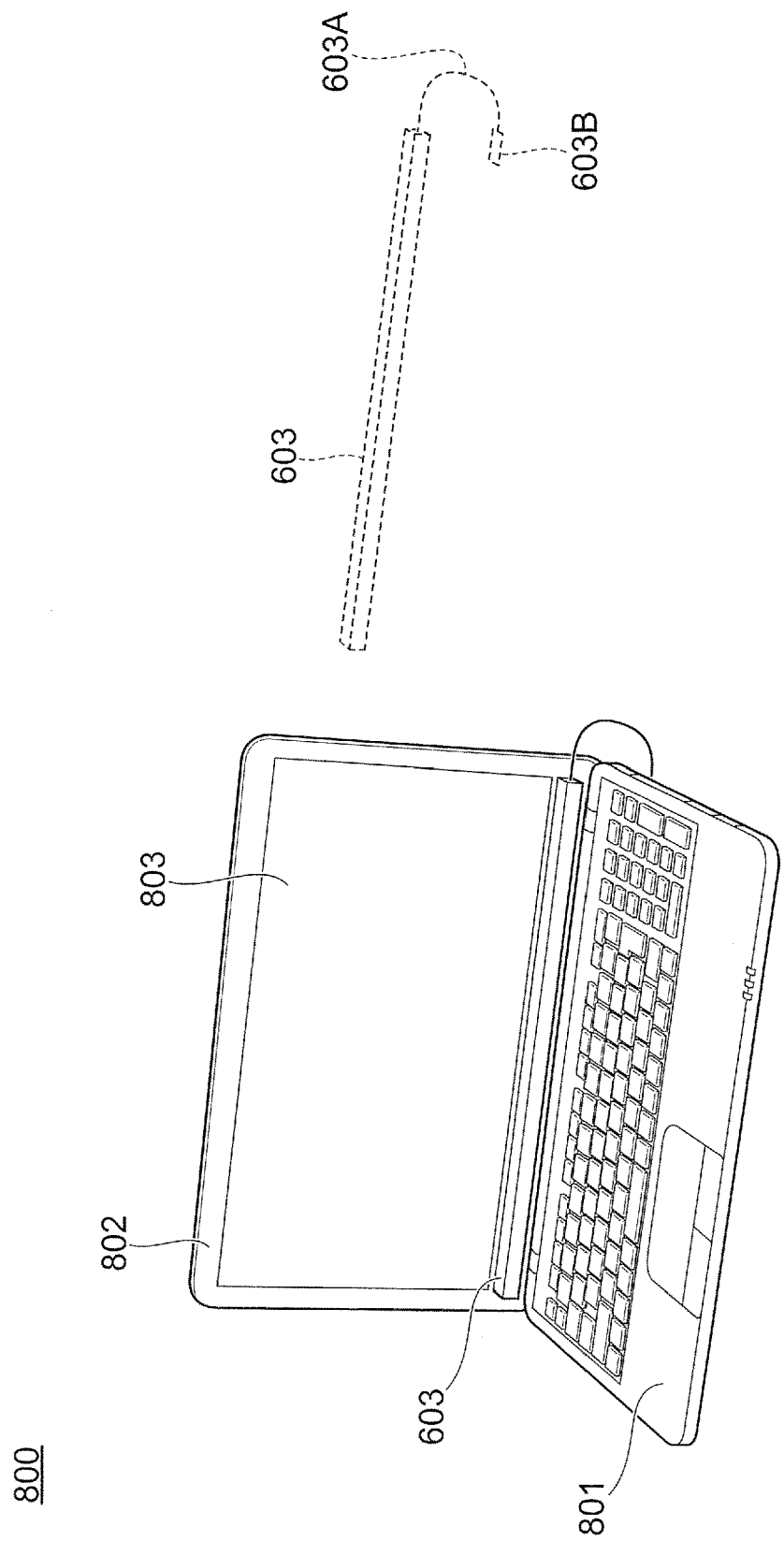
FIG. 21 is an external view of an information terminal, according to a third exemplary embodiment, to and from which the coordinate detection sensor is attachable and detachable.

FIG. 21 is an external view of an information terminal 800, according to a third exemplary embodiment, to and from which the coordinate detection sensor 603 is attachable and detachable. In this example, the information terminal 800 is a notebook-type computer. The information terminal 800 has an apparatus body 801 containing an electronic substrate and a hard disk device therein, and also has a cover 802 in which a display unit 803 is disposed.

In this exemplary embodiment, the coordinate detection sensor 603 is stored in an independent housing, and a connector 603B is attached to one end of the housing via a cable 603A. The connector 603B is for connecting to the apparatus body 801 and is used for data communication as well as for feeding power from the apparatus body 801.

Figure 22:
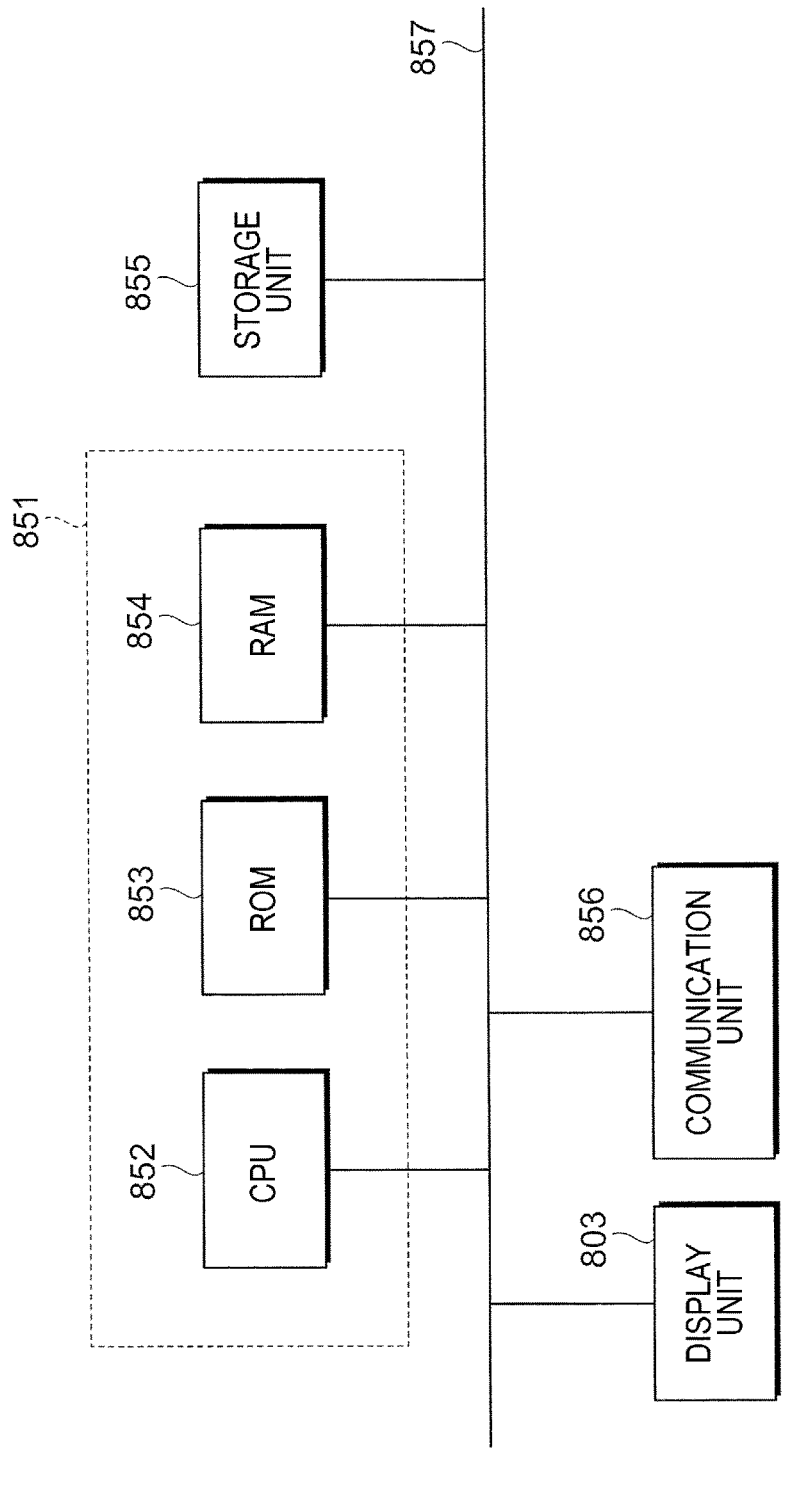
FIG. 22 illustrates an example of a functional block configuration of a controller and other devices constituting the information terminal.

FIG. 22 illustrates an example of a functional block configuration of a controller 851 and other devices constituting the information terminal 800. The information terminal 800 has the controller 851 that controls the entire apparatus, the display unit 803 used for displaying an image, a storage unit 855 used for storing various types of data and programs, and a communication unit 856 used for communication with an external device (such as the coordinate detection sensor 603).

These units are connected to one another by, for example, a bus 857 and exchange data via the bus 857.

The controller 851 includes a CPU 852, a ROM 853, and a RAM 854. The ROM 853 stores a program to be executed by the CPU 852. The CPU 852 uses the RAM 854 as a work area and executes the program read from the ROM 853. By executing the program, the units in the information terminal 800 are controlled.

The controller 851 in this exemplary embodiment provides the function of an input device together with the coordinate detection sensor 603.

In this exemplary embodiment, the CPU 852 functioning as an operation-input-detection functional unit uses a dedicated interface screen for inputting the installation position of the coordinate detection sensor 603.

FIG. 23 illustrates an example of an interface screen displayed on the display unit 803 for receiving the installation position of the coordinate detection sensor 603. In this interface screen, installation-position candidates 901 to 904 are disposed along the four sides of a rectangle 900 indicating the position of the display unit 803.

The installation-position candidate 901 is disposed along the upper side of the rectangle 900, the installation-position candidate 902 is disposed along the right side of the rectangle 900, the installation-position candidate 903 is disposed along the left side of the rectangle 900, and the installation-position candidate 904 is disposed along the lower side of the rectangle 900.

The interface screen displays a guidance message "click on installation position of coordinate detection sensor". When the user clicks any of the installation-position candidates on the screen in accordance with the guidance message, the information about the clicked installation-position candidate is received as the position of the coordinate detection sensor 603.

In this exemplary embodiment, after the coordinate detection sensor 603 is installed, it is desirable to perform a correcting operation for associating the output coordinates of the coordinate detection sensor 603 with the four sides of the display unit 803.

If it is confirmed that the coordinate detection sensor 603 is distant from an outer edge of the display unit 803 by a predetermined distance or more (e.g., larger than or equal to the width W15 in FIG. 19) as a result of executing the output-coordinate correcting operation after the coordinate detection sensor 603 is installed, the aforementioned layout changing operation does not have to be executed.

The coordinate detection sensor 603 has a height of, for example, 17 mm (i.e., height from the installation surface). This numerical value is merely an example and may be, for example, 10 mm or more. The same applies to the other protrusions described above.

Other Exemplary Embodiments

Although exemplary embodiments of the present invention have been described above, the technical scope of the invention is not to be limited to the scope defined in the above exemplary embodiments. It is obvious from the scope of the claims that various modifications and variations added to the above exemplary embodiments are included in the technical scope of the invention.

For example, although an operation performed on an operator displayed on the display unit 301 is detected by using a contact-type coordinate input device in the image forming apparatus 1 according to the first exemplary embodiment, the aforementioned contact-type coordinate input device may be replaced with a noncontact-type coordinate input device.

Furthermore, although an operation performed on an operator displayed on the display unit 602 is detected by using a noncontact-type coordinate input device in the second exemplary embodiment, a contact-type coordinate input device may be used.

In the above exemplary embodiments, the image forming apparatus 1 and the information terminals 600 and 800 are exemplified as apparatuses to which the input device having the function of changing the positional layout of operators in accordance with the positional relationship between the protrusion and the operators is applied. Alternatively, the input device may be applied to, for example, a smartphone, a portable gaming apparatus, a navigation apparatus, a transport-ticket vending machine, a ticket vending machine, or an automatic teller machine.

What is claimed is:

1. An input device comprising:
a display including a first region that displays contents and a second region that displays an operator that receives a command input with respect to the displayed contents;
a protrusion disposed alongside and laterally outside of the display so that the protrusion does not cover a viewable area of the display; and
a detector in which a display region of the display is set as a detection range and that detects the command input by an input object,
wherein a positional layout of the second region displayed on the display changes in accordance with a positional relationship with the protrusion.

2. The input device according to claim 1, wherein the second region is a strip-shaped region extending along an outer edge of the display.

3. The input device according to claim 2, wherein the operator is used for scroll display of the contents.

4. The input device according to claim 2, wherein the operator is an index used for jump display of the contents.

5. The input device according to claim 1, wherein the second region is displayed so as to overlap the first region.

6. The input device according to claim 5, wherein the second region is disposed in a region at one of outer edges of the display that is not provided with the protrusion.

7. The input device according to claim 6, wherein the region is one of the outer edges of the display opposite from the protrusion.

8. The input device according to claim 5, wherein, when the second region is disposed in an outer-edge region of the display where the protrusion is provided, a third region that is not used for the command input is disposed between the second region and the protrusion.

9. The input device according to claim 1, wherein, when the second region is disposed in an outer-edge region of the display where the protrusion is provided, a display width of the second region is larger than when the second region is disposed in another outer-edge region of the display.

10. The input device according to claim 1, wherein the second region is displayed so as not to overlap the first region.

11. The input device according to claim 1, wherein a positional relationship between an upper side of the display and the protrusion is preliminarily detected.

12. The input device according to claim 1, wherein, the protrusion is attachable to and detachable from an apparatus body, and an installation position of the protrusion on the display is preliminarily set.

13. The input device according to claim 12, wherein the installation position of the protrusion on the apparatus body is received via a setting screen.

14. The input device according to claim 1, wherein the protrusion is a structural body accommodating the detector that optically detects the command input.

15. A non-transitory computer readable medium storing a program causing a computer to execute a process, the process comprising:
causing a display to display a first region that displays contents and a second region that displays an operator that receives a command input with respect to the displayed contents;
detecting the command input by an input object by using a display region of the display as a detection range; and
changing a positional layout of the second region in accordance with a positional relationship with a protrusion disposed alongside and laterally outside of the display so that the protrusion does not cover a viewable area of the display.

16. An input device comprising:
a display including a first region that displays contents and a second region that displays an operator that receives a command input with respect to the displayed contents;
a protrusion disposed alongside the display; and
a detector in which a display region of the display is set as a detection range and that detects the command input by an input object,
wherein a positional layout of the second region displayed on the display changes when the operator is positioned within a predetermined reference distance to the protrusion such that (1) the operator is moved away from the protrusion or (2) a width of the operator is expanded in a direction away from the protrusion.

* * * * *